US012421054B2

(12) United States Patent
Matsuoka et al.

(10) Patent No.: US 12,421,054 B2
(45) Date of Patent: Sep. 23, 2025

(54) ROBOTIC MULTI-SURFACE GRIPPER ASSEMBLIES AND METHODS FOR OPERATING THE SAME

(71) Applicant: MUJIN, Inc., Tokyo (JP)

(72) Inventors: Shintaro Matsuoka, Tokyo (JP);
Hironori Mizoguchi, Tokyo (JP);
Rosen Nikolaev Diankov, Tokyo (JP);
Yoshiki Kanemoto, Tokyo (JP); Jinze Yu, Tokyo (JP)

(73) Assignee: Mujin, Inc., Tokyo (JP)

( * ) Notice: Subject to any disclaimer, the term of this patent is extended or adjusted under 35 U.S.C. 154(b) by 758 days.

(21) Appl. No.: 17/720,206

(22) Filed: Apr. 13, 2022

(65) Prior Publication Data

US 2022/0332524 A1 Oct. 20, 2022

Related U.S. Application Data

(60) Provisional application No. 63/175,649, filed on Apr. 16, 2021.

(51) Int. Cl.
*B25J 15/06* (2006.01)
*B65G 47/91* (2006.01)

(52) U.S. Cl.
CPC ............ *B65G 47/91* (2013.01); *B65G 47/917* (2013.01)

(58) Field of Classification Search
CPC ...... B65G 47/91; B65G 47/917; B65G 61/00; B65G 47/918; B25J 15/0052; B25J 15/0061; B25J 15/0616
See application file for complete search history.

(56) References Cited

U.S. PATENT DOCUMENTS

| | | | |
|---|---|---|---|
| 9,120,230 B2 * | 9/2015 | Lipson | B25J 15/12 |
| 9,498,887 B1 * | 11/2016 | Zevenbergen | B25J 15/0052 |
| 10,625,430 B2 * | 4/2020 | Lee | B25J 15/08 |
| 11,318,620 B2 * | 5/2022 | Wicks | B25J 19/02 |
| 11,584,026 B2 * | 2/2023 | Alspach | B25J 15/0033 |
| 2001/0052708 A1 | 12/2001 | Schmalz et al. | |
| 2010/0239408 A1 | 9/2010 | Becket et al. | |
| 2017/0113885 A1 | 4/2017 | Criswell | |
| 2018/0290845 A1 | 10/2018 | McMurrough et al. | |
| 2018/0297200 A1 | 10/2018 | Nakayama | |
| 2019/0344447 A1 | 11/2019 | Wicks et al. | |
| 2020/0047331 A1 | 2/2020 | Chitta et al. | |
| 2020/0078938 A1 | 3/2020 | Bradski et al. | |
| 2021/0053230 A1 * | 2/2021 | Mizoguchi | B25J 19/023 |
| 2022/0274262 A1 * | 9/2022 | Nagakari | B25J 9/1633 |

FOREIGN PATENT DOCUMENTS

| | | |
|---|---|---|
| CN | 105143075 A | 12/2015 |
| EP | 3623324 A1 | 3/2020 |
| JP | 2019188600 A | 10/2019 |

(Continued)

OTHER PUBLICATIONS

Office Action for Chinese Patent Application No. 202211436785.8 issued Apr. 11, 2025, 8 pages.

(Continued)

*Primary Examiner* — Masud Ahmed
(74) *Attorney, Agent, or Firm* — Dorsey & Whitney LLP

(57) ABSTRACT

A system and method for operating a transfer robot and a multi-surface gripper to grasp and transfer objects is disclosed.

20 Claims, 24 Drawing Sheets

(56) References Cited

FOREIGN PATENT DOCUMENTS

| JP | 2019218166 A | 12/2019 |
| KR | 2020080001013 U | 2/2008 |
| WO | 2019049772 A1 | 3/2019 |
| WO | 2021035062 A1 | 2/2021 |
| WO | 2021070076 A1 | 4/2021 |

OTHER PUBLICATIONS

Extended European Search Report for International Application No. PCT/US2022024661 received Oct. 9, 2024, 10 pages.
Notice of Reasons for Rejection for Japanese Application No. 2022-535879 received Mar. 30, 2023, 11 pages with English translation.
Decision of Rejection for Japanese Application No. 2022-535879 received May 15, 2023, 11 pages with English translation.
Office Action for Japanese Application No. 2022-535879 received Oct. 3, 2023, 3 pages.
Decision to Grant for Japanese Application No. 2022-535879 received Oct. 23, 2023, 3 pages.
International Search Report and Written Opinion for Application No. PCT/US2022/024661 received Jul. 27, 2022, 12 pages.

* cited by examiner

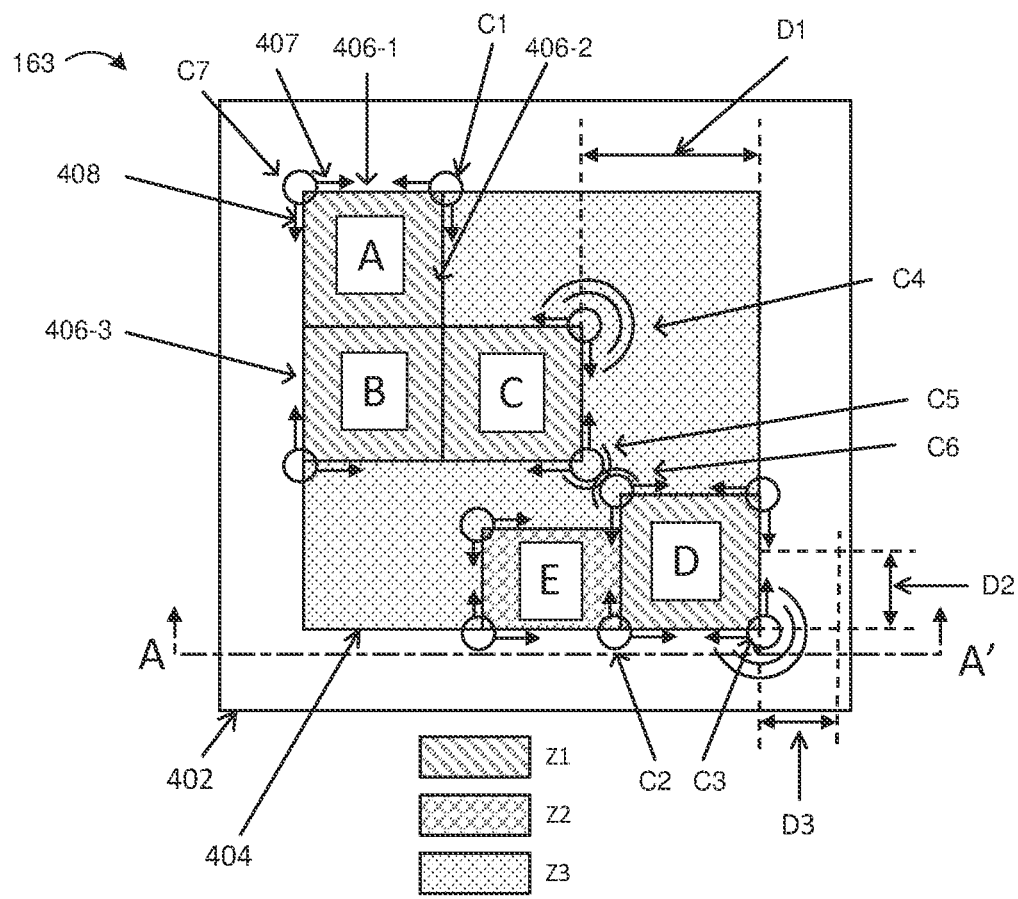
Fig. 4A (top view)
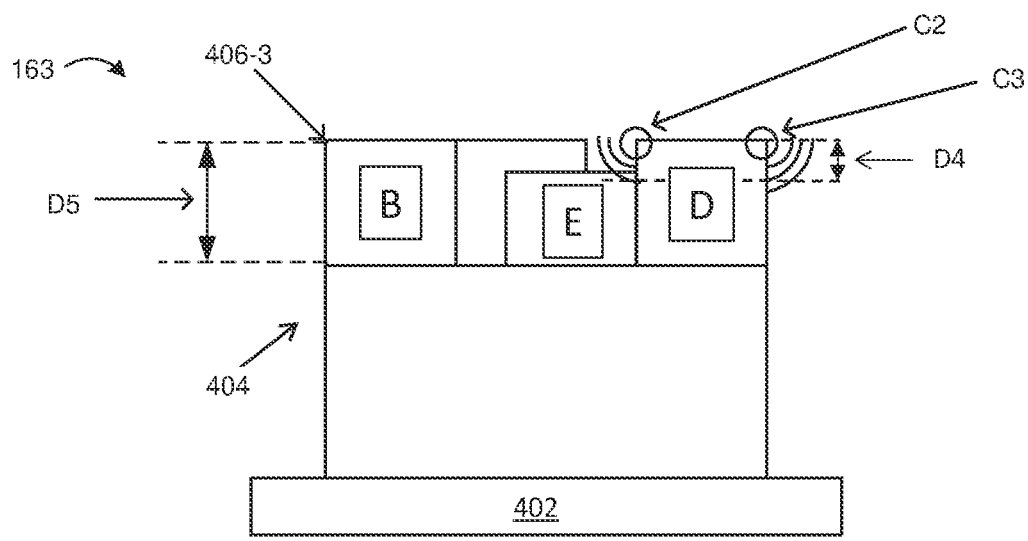
Fig. 4B (sideview)

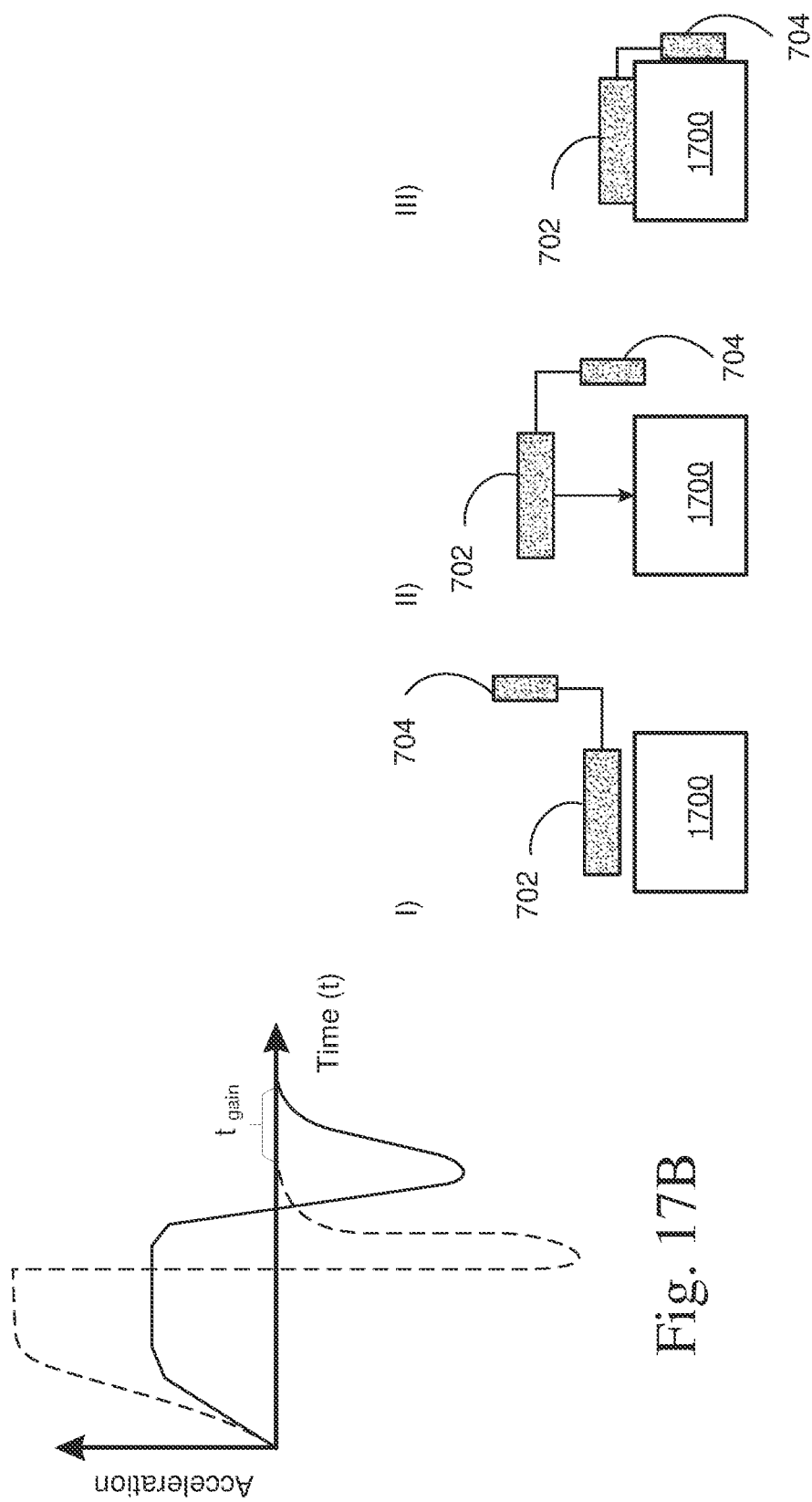

US 12,421,054 B2

ROBOTIC MULTI-SURFACE GRIPPER ASSEMBLIES AND METHODS FOR OPERATING THE SAME

CROSS-REFERENCE TO RELATED APPLICATIONS

This application claims the benefit of U.S. Provisional Patent Application Ser. No. 63/175,649, filed Apr. 16, 2021, which is incorporated herein by reference in its entirety.

This application contains subject matter related to U.S. patent application Ser. No. 16/998,857, filed Aug. 20, 2020, titled "ROBOTIC MULTI-GRIPPER ASSEMBLIES AND METHODS FOR GRIPPING AND HOLDING OBJECTS" and U.S. patent application Ser. No. 16/667,822, filed Jul. 13, 2021, which has issued as U.S. Pat. No. 11,062,457, titled "ROBOTIC SYSTEM WITH AUTOMATED PACKAGE REGISTRATION MECHANISM AND MINIMUM VIABLE REGION DETECTION," which are incorporated herein by reference in their entirety.

TECHNICAL FIELD

The present technology is directed generally to robotic systems and, more specifically, robotic multi-surface grippers assemblies configured to selectively grip and hold objects.

BACKGROUND

Robots (e.g., machines configured to automatically/autonomously execute physical actions) are now extensively used in many fields. Robots, for example, can be used to execute various tasks (e.g., manipulate or transfer an object) in manufacturing, packaging, transport and/or shipping, etc. In executing the tasks, robots can replicate human actions, thereby replacing or reducing human involvements that are otherwise required to perform dangerous or repetitive tasks. Robots often lack the sophistication necessary to duplicate human sensitivity and/or adaptability required for executing more complex tasks. For example, robots often have difficulty selectively gripping object(s) from a group of objects with immediately neighboring objects, as well as irregular-shaped/sized objects, etc. Also, robots are often limited to grasping objects using force applied along one predetermined direction. Accordingly, there remains a need for improved robotic systems and techniques for controlling and managing various aspects of the robots.

BRIEF DESCRIPTION OF THE DRAWINGS

FIGS. 4A and 4B illustrate an example object stack to be processed by the robotic system of FIG. 1 in accordance with one or more embodiments of the present technology.

FIGS. 17A-17C illustrate details of example embodiments of operation of a robotic system in accordance with one or more embodiments of the present technology.

DETAILED DESCRIPTION

Figure 1:
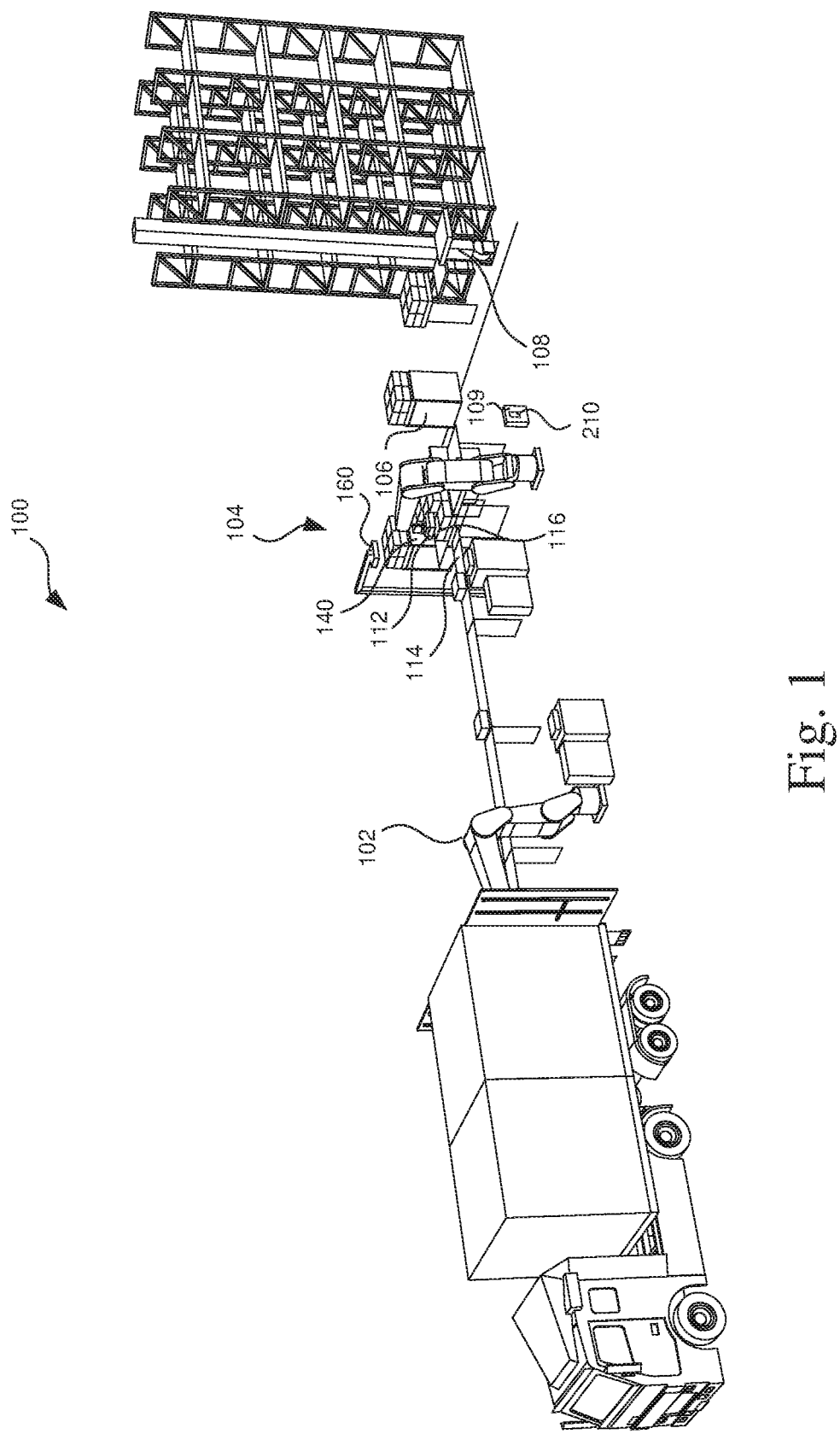
FIG. 1 illustrates an example environment in which a robotic system transports objects in accordance with one or more embodiments of the present technology.

Systems and methods for gripping selected objects are described herein. The systems can include a transport robot with multi-gripper assemblies configured to be operated independently or in conjunction to grip/release a single object or a plurality of objects. The multi-gripper assemblies can include a set of grip pads and/or interfaces, where each pad/interface is configured to concurrently grasp multiple surfaces. For example, the systems can use multi-surface gripper assemblies (e.g., an L-shaped multi-surface gripper) to concurrently grasp orthogonal surfaces (e.g., the top surface and one peripheral or vertical surface) of one or more objects. The systems can derive a plan for transferring one or more objects using the multi-gripper assemblies. Accordingly, the systems can derive access sequences, release poses, and/or motion plans for transferring the one or more objects. Also, the systems can derive each motion plan based on optimizing the overall transfer time, such as by selectively engaging a side pad when doing so reduces the overall transfer time due to increased transfer rate. The systems may further derive each motion plan based on orienting the side pad relative to a direction of the planned motion to further increase the transfer rate.

The multi-surface gripper can provide increased grip forces and further increase the locations and/or directions where the gripping forces may be applied. Accordingly, the multi-surface gripper can reduce package damages (e.g., rips or tears in package covers) and reduce overall transfer times. Moreover, when the multi-surface gripper includes the side pad, the gripper can provide a structural support that addresses inertia that corresponds to a lateral transfer of the grasped object. Thus, the transfer rate can be increased, thereby further reducing the transfer time.

In the following, numerous specific details are set forth to provide a thorough understanding of the presently disclosed technology. In other embodiments, the techniques introduced here can be practiced without these specific details. In other instances, well-known features such as specific functions or routines are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers, or the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium, including a tangible, non-transient computer-readable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Suitable Environments

FIG. 1 is an illustration of an example environment in which a robotic system 100 transports objects. The robotic system 100 can include an unloading unit 102, a transfer unit or assembly 104 ("transfer assembly 104"), a transport unit 106, a loading unit 108, or a combination thereof in a warehouse or a distribution/shipping hub. Each of the units of the robotic system 100 can be configured to execute one or more tasks. The tasks can be combined in sequence to perform an operation that achieves a goal, such as to unload objects from a truck or a van for storage in a warehouse or to unload objects from storage locations and load them onto a truck or a van for shipping. In another example, the task can include moving objects from one container to another container. Each of the units can be configured to execute a sequence of actions (e.g., operating one or more components therein) to execute a task.

In some embodiments, the task can include manipulation (e.g., moving and/or reorienting) of a target object or package 112 (e.g., boxes, cases, cages, pallets, etc.) from a start location 114 to a task location 116. For example, the unloading unit 102 (e.g., a devanning robot) can be configured to transfer the target package 112 from a location in a carrier (e.g., a truck) to a location on a conveyor belt. The transfer assembly 104 (e.g., a palletizing robot assembly) can be configured to load packages 112 onto the transport unit 106 or a conveyor. In another example, the transfer assembly 104 can be configured to transfer one or more target packages 112 from one container to another container. The transfer assembly 104 can include a robotic end effector 140 ("end effector 140") with vacuum grippers (or vacuum regions) each individually operated to pick up and carry object(s) (e.g., target package(s) 112). When the end effector 140 is placed adjacent an object, air can be drawn into the gripper(s) adjacent to target packages 112, thereby creating a pressure differential sufficient for retaining the target objects. The target objects can be picked up and transported without damaging or marring the object surfaces. The number of packages 112 carried at one time can be selected based upon stacking arrangements of objects at the pickup location, available space at the drop off location, transport paths between pickup and drop off locations, optimization routines (e.g., routines for optimizing unit usage, robotic usage, etc.), combinations thereof, or the like. The end effector 140 can have one or more sensors configured to output readings indicating information about retained objects (e.g., number and configurations of retained objects), relative positions between any retained objects, or the like.

An imaging system 160 can provide image data used to monitor the operation of components, identify target objects, track objects, or otherwise perform tasks. The image data can be analyzed to evaluate, for example, package stacking arrangements (e.g., stacked packages such as carboard boxes, packing containers, etc.), positional information of objects, available transport paths (e.g., transport paths between pickup zones and drop off zones), positional information about gripping assemblies, or combinations thereof. A controller 109 can communicate with the imaging system 160 and other components of the robotic system 100. The controller 109 can generate transport plans that include a sequence for picking up and dropping off objects (e.g., illustrated as stable containers), positioning information, order information for picking up objects, order information for dropping off objects, stacking plans (e.g., plans for stacking objects at the drop off zone), re-stacking plans (e.g., plans for re-stacking at least some of the containers at the pickup zone), or combinations thereof. The information and instructions provided by transport plans can be selected based on the arrangement of the containers, the contents of the containers, or combinations thereof. In some embodiments, the controller 109 can include electronic/electrical devices, such as one or more processing units, processors, storage devices (e.g., external or internal storage devices, memory, etc.), communication devices (e.g., communication devices for wireless or wired connections), and input-output devices (e.g., screens, touchscreen displays, keyboards, keypads, etc.). Example electronic/electrical devices and controller components are discussed in connection with FIGS. 2 and 6.

The transport unit 106 can transfer the target package 112 (or multiple target packages 112) from an area associated with the transfer assembly 104 to an area associated with the loading unit 108, and the loading unit 108 can transfer the target package 112 (by, e.g., moving the pallet carrying the target package 112) to a storage location. In some embodiments, the controller 109 can coordinate the operation of the transfer assembly 104 and the transport unit 106 to efficiently load objects onto storage shelves.

The robotic system 100 can include other units, such as manipulators, service robots, modular robots, etc., not shown in FIG. 1. For example, in some embodiments, the robotic system 100 can include a de-palletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof. Components and subsystems of the system 100 can include different types of end effectors. For example, unloading unit 102, transport unit 106, loading unit 108, and other components of the robotic system 100 can also include robotic multi-gripper assemblies. The configurations of the robotic gripper assemblies can be selected based on desired carrying capabilities. For illustrative purposes, the robotic system 100 is described in the context of a shipping center; however, it is understood that the robotic system 100 can be configured to execute tasks in other environments/purposes, such as for manufacturing, assembly, packaging, healthcare, and/or other types of automation. Details regarding the task and the associated actions are described below.

Robotic Systems

Figure 2:
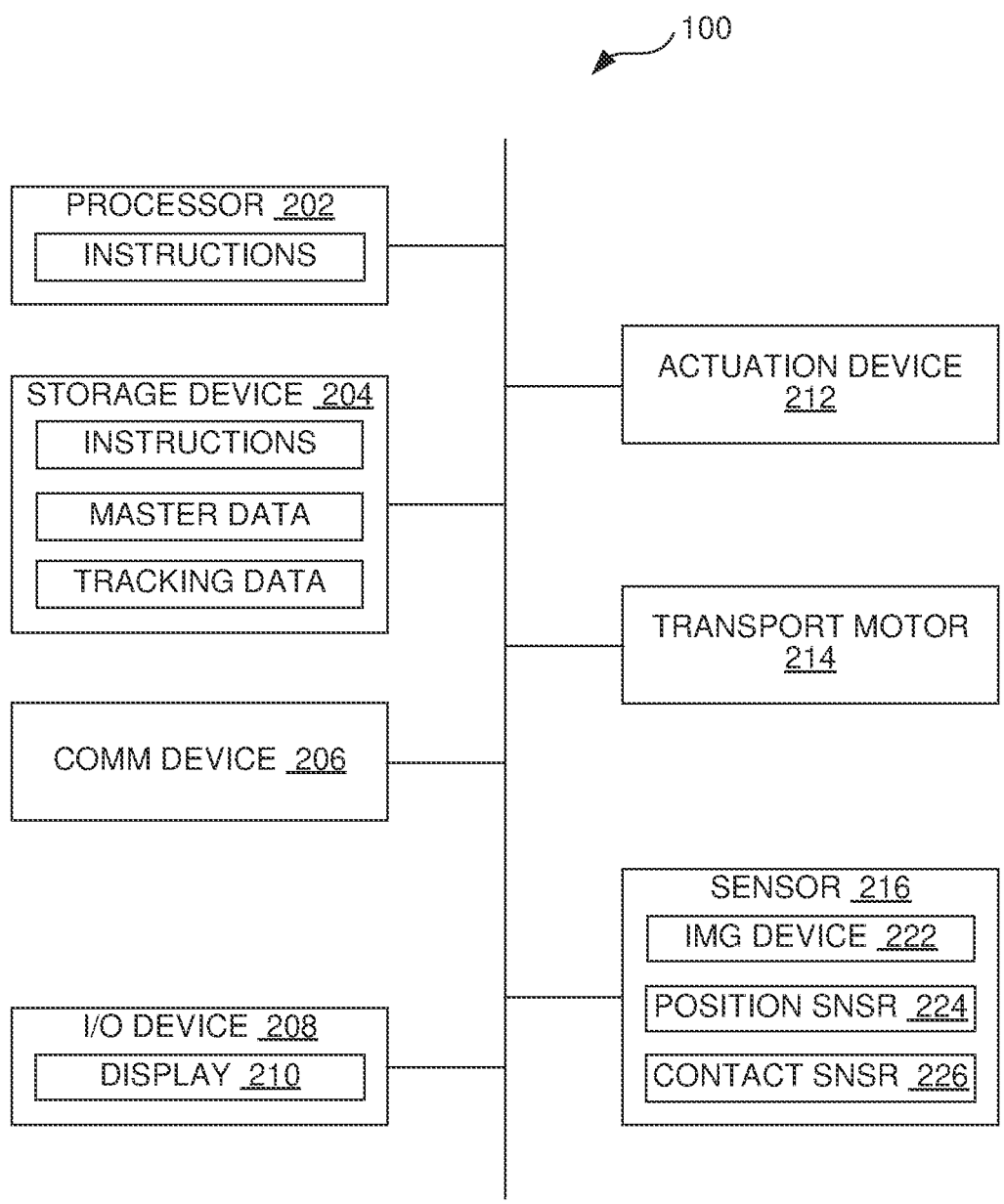
FIG. 2 is a block diagram illustrating the robotic system in accordance with one or more embodiments of the present technology.

FIG. 2 is a block diagram illustrating components of the robotic system 100 in accordance with one or more embodiments of the present technology. In some embodiments, for example, the robotic system 100 (e.g., at one or more of the units or assemblies and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, controllers, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, Zigbee, Z-wave, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to master data, processing results, and/or predetermined data/thresholds. For example, the storage devices 204 can store master data that includes descriptions of objects (e.g., boxes, cases, containers, and/or products) that may be manipulated by the robotic system 100. In one or more embodiments, the master data can include a dimension, a shape (e.g., templates for potential poses and/or computer-generated models for recognizing the object in different poses), mass/weight information, a color scheme, an image, identification information (e.g., bar codes, quick response (QR) codes, logos, etc., and/or expected locations thereof), an expected mass or weight, or a combination thereof for the objects expected to be manipulated by the robotic system 100. In some embodiments, the master data can include manipulation-related information regarding the objects, such as a CoM location on each of the objects, expected sensor measurements (e.g., force, torque, pressure, and/or contact measurements) corresponding to one or more actions/maneuvers, or a combination thereof. The robotic system can look up pressure levels (e.g., vacuum levels, suction levels, etc.), gripping/pickup areas (e.g., areas or banks of vacuum grippers to be activated), and other stored master data for controlling transfer robots. The storage devices 204 can also store object tracking data. In some embodiments, the object tracking data can include a log of scanned or manipulated objects. In some embodiments, the object tracking data can include image data (e.g., a picture, point cloud, live video feed, etc.) of the objects at one or more locations (e.g., designated pickup or drop locations and/or conveyor belts). In some embodiments, the object tracking data can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

In some embodiments, a controller (e.g., controller 109 of FIG. 1) can include the processors 202, storage devices 204, communication devices 206, and/or input-output devices 208. The controller can be a stand-alone component or part of a unit/assembly. For example, each unloading unit, a transfer assembly, a transport unit, and a loading unit of the system 100 can include one or more controllers. In some embodiments, a single controller can control multiple units or stand-alone components.

The robotic system 100 can include physical or structural members (e.g., robotic manipulator arms) connected at joints for motion (e.g., rotational and/or translational displacements). The structural members and the joints can form a kinetic chain configured to manipulate an end effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place. For example, the actuation devices 212 and transport motors connected to or part of a robotic arm, a linear slide, or other robotic components.

The sensors 216 can be configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or for a surrounding environment. Some examples of the sensors 216 can include contact sensors, proximity sensors, accelerometers, gyroscopes, force sensors, strain gauges, torque sensors, position encoders, pressure sensors, vacuum sensors, etc.

In some embodiments, for example, the sensors 216 can include one or more imaging devices 222 (e.g., two-dimensional (2D) and/or three-dimensional (3D) imaging devices) configured to detect the surrounding environment. The imaging devices can include cameras (including visual and/or infrared cameras), lidar devices, radar devices, and/or other distance-measuring or detecting devices. The imaging devices 222 can generate a representation of the detected environment, such as a digital image and/or a point cloud, used for implementing machine/computer vision (e.g., for automatic inspection, robot guidance, or other robotic applications).

Referring now to FIGS. 1 and 2, the robotic system 100 (via, e.g., the processors 202) can process image data and/or the point cloud to identify the target package 112 of FIG. 1, the start location 114 of FIG. 1, the task location 116 of FIG. 1, a pose of the target package 112 of FIG. 1, or a combination thereof. The robotic system 100 can use image data to determine how to access and pick up objects. Images of the objects can be analyzed to determine a pickup plan for positioning a vacuum gripper assembly to grip targeted objects even though adjacent objects may also be proximate to the gripper assembly. Imaging output from onboard sensors 216 (e.g., lidar devices) and image data from remote devices (e.g., the imaging system 160 of FIG. 1) can be utilized alone or in combination. The robotic system 100 (e.g., via the various units) can capture and analyze an image of a designated area (e.g., inside the truck, inside the container, or a pickup location for objects on the conveyor belt) to identify the target package 112 and the start location 114 thereof. Similarly, the robotic system 100 can capture and analyze an image of another designated area (e.g., a drop location for placing objects on the conveyor belt, a location for placing objects inside the container, or a location on the pallet for stacking purposes) to identify the task location 116.

Also, for example, the sensors 216 of FIG. 2 can include position sensors 224 of FIG. 2 (e.g., position encoders, potentiometers, etc.) configured to detect positions of structural members (e.g., the robotic arms and/or the end effectors) and/or corresponding joints of the robotic system 100. The robotic system 100 can use the position sensors 224 to track locations and/or orientations of the structural members and/or the joints during the execution of the task. The unloading unit, transfer unit, transport unit/assembly, and the loading unit disclosed herein can include the sensors 216.

In some embodiments, the sensors 216 can include contact sensors 226 (e.g., force sensors, strain gauges, piezoresistive/piezoelectric sensors, capacitive sensors, elastoresistive sensors, and/or other tactile sensors) configured to measure a characteristic associated with a direct contact between multiple physical structures or surfaces. The contact sensors 226 can measure the characteristic that corresponds to a grip of the end effector (e.g., the gripper) on the target package 112. Accordingly, the contact sensors 226 can output a contact measurement that represents a quantified measurement (e.g., a measured force, torque, position, etc.) corresponding to physical contact, a degree of contact or attachment between the gripper and the target package 112, or other contact characteristics. For example, the contact measurement can include one or more force, pressure, or torque readings associated with forces associated with gripping the target package 112 by the end effector. In some embodiments, the contact measurement can include both (1) pressure readings associated with vacuum gripping and (2) force readings (e.g., moment readings) associated with carrying object(s).

As described in further detail below, the robotic system 100 (via, e.g., the processors 202) can implement different actions to accomplish tasks based on the contact measurement, image data, combinations thereof, etc. For example, the robotic system 100 can regrip the target package 112 if the initial contact measurement is below a threshold, such as the vacuum grip is low (e.g., a suction level is below a vacuum threshold), or combinations thereof. Also, the robotic system 100 can intentionally drop the target package 112, adjust the task location 116, adjust a speed or an acceleration for the action, or a combination thereof based on one or more transport rules (e.g., if the contact measure or suction level falls below a threshold during the execution of the task) and the contact measurements, image data, and/or other readings or data.

Robotic Transfer Assembly

Figure 3:
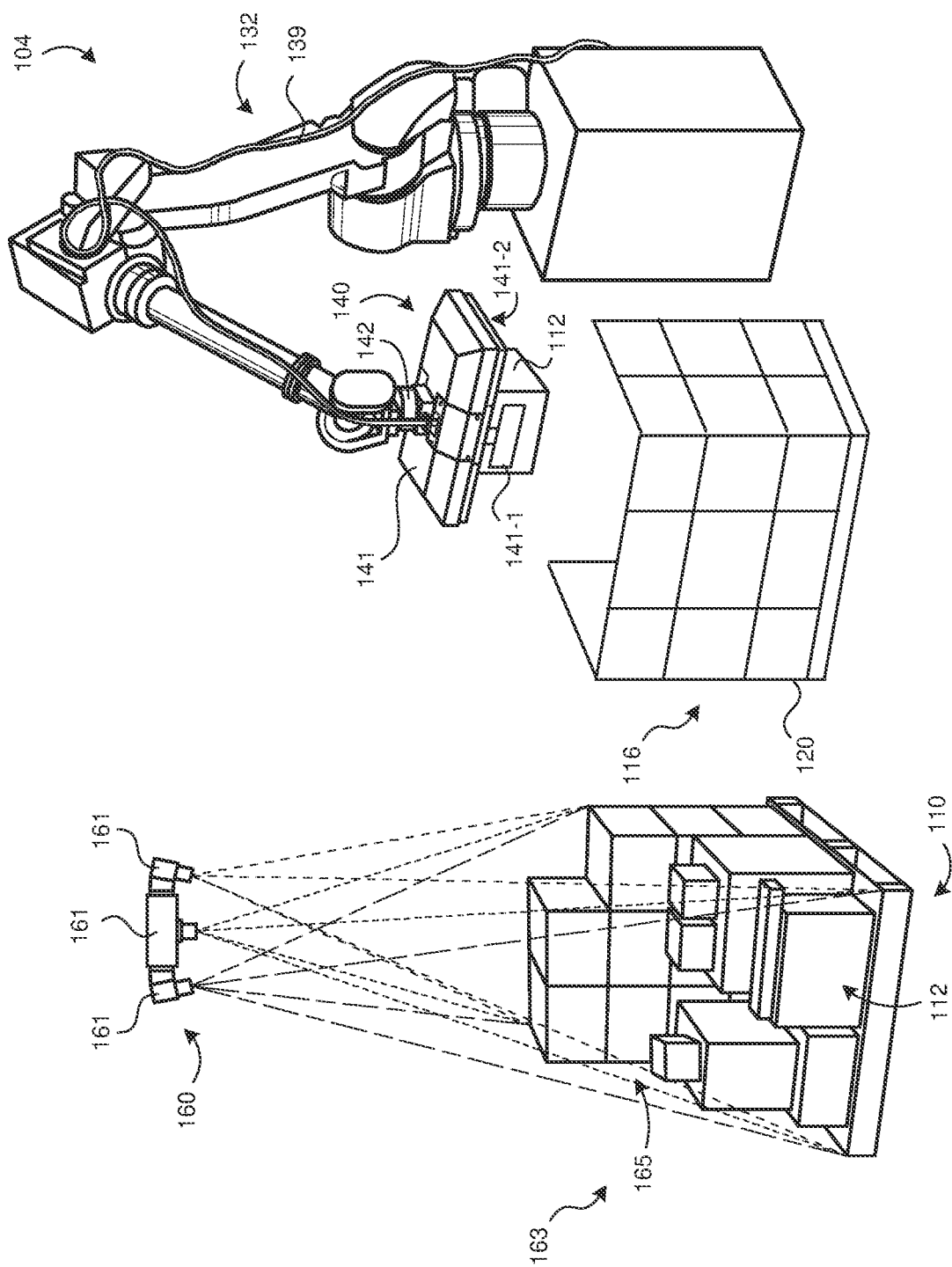
FIG. 3 illustrates a multi-component transfer assembly in accordance with one or more embodiments of the present technology.

FIG. 3 illustrates the transfer assembly 104 in accordance with one or more embodiments of the present technology. The transfer assembly 104 can include the imaging system 160 and a robotic arm system 132. The imaging system 160 can provide image data captured from a target environment including the start location 114 which, in this embodiment, can be a de-palletizing platform 110. The robotic arm system 132 can include a robotic arm assembly 139 and an end effector 140, which includes a multi-surface gripper assembly 141 (also referred to as an "L-shape gripper assembly 141"). The multi-surface gripper assembly 141 includes at least two gripping apparatuses such as a side pad 141-1 and top pad 141-2 shown in FIG. 3. The robotic arm assembly 139 can position the end effector 140 above a group of objects in an object stack 165 located at a source location 163 and transfer an object from the object stack 165 from the source location 163 to the task location 116.

Target objects can be secured against the bottom of the end effector 140. In some embodiments, the multi-surface gripper assembly 141 can have addressable regions each selectively capable of drawing in air for providing a vacuum grip. In some modes of operation, only addressable regions proximate to the targeted object(s) draw in air to provide a pressure differential directly between the vacuum gripper device and the targeted object(s). This allows only selected packages (i.e., targeted packages) to be pulled or otherwise secured against the multi-surface gripper assembly 141 even though other gripping portions of the multi-surface gripper assembly 141 are adjacent to or make contact with other packages.

FIG. 3 shows the multi-surface gripper assembly 141 carrying the package 112 ("package 112") positioned above a cage cart 120. The cage cart 120 can include a bottom platform and one or more vertical walls defining a cart for holding objects. For example, the cage cart 120 includes three walls defining three sides of a cage while one side is left open to allow the end effector 140 to approach or enter the cage cart 120. The multi-surface gripper assembly 141 can release the package 112 onto the task location 116, such as a location corresponding to or within the cage cart 120 or a conveyer belt.

With continued reference to FIG. 3, the de-palletizing platform 110 (e.g., the start location 114) can include any platform, surface, and/or structure upon which a plurality of objects or packages 112 (singularly, "package 112") may be stacked and/or staged and ready to be transported. The imaging system 160 can include one or more sensors 161 (e.g., imaging devices) configured to capture image data of the packages 112 on the de-palletizing platform 110. The sensors 161 can capture distance data, position data, video, still images, lidar data, radar data and/or motion at the source location 163. It should be noted that, although the terms "object" and "package" are used herein, the terms include any other items capable of being gripped, lifted, transported, and delivered such as, but not limited to, "case," "box," "carton," or any combination thereof. Moreover, although polygonal boxes (e.g., rectangular boxes) are illustrated in the drawings disclosed herein, the shapes of the boxes are not limited to such shape but include any regular or irregular shape that, as discussed in detail below, is capable of being gripped, lifted, transported, and delivered.

Like the de-palletizing platform 110, the receiving cage cart 120 can include any platform, surface, and/or structure designated to receive the packages 112 for further tasks/operations. In some embodiments, the receiving cage cart 120 can include a conveyor system for transporting the package 112 from one location (e.g., a release point) to another location for further operations (e.g., sorting and/or storage).

Detection and Analyses of Objects

FIGS. 4A and 4B illustrate an example of an object stack 404 to be processed by the robotic system 100 of FIG. 1. FIG. 4A is a representative top view of the object stack 404 on a pallet 402 and FIG. 4B is a representative side view of the object stack 404 on the pallet 402 along a reference line AA' illustrated in FIG. 4A, all in accordance with one or more embodiments of the present technology. The object stack 404 may correspond to the object stack 404 described above with respect to FIG. 3. Referring to FIGS. 4A and 4B together, the robotic system 100 can be configured to transfer the objects within the object stack 404 at a source location (e.g., the source location 163 in FIG. 3) to another location, such as to the cage cart 120 of FIG. 3, as described above.

As an example, FIGS. 4A and 4B illustrate objects A to E (e.g., boxes or packages) as the top layer of objects in the object stack 404. In FIG. 4A, the robotic system 100 described with respect to FIG. 1 can identify, based on captured 2D and 3D image data and/or other sensor data, three surface zones, Z1, Z2, and Z3. A surface zone refers to an area having a uniform or nearly uniform depth (e.g., within a threshold range of nearby points) based on the image data. The zone Z1 corresponding to top surfaces of the objects A, B, C, and D can have a first depth, the zone Z2 corresponding to a top surface of the object E can have a second depth, and the zone Z3 corresponding to a surface of a lower level or layer can have a third depth. The first depth, the second depth, and the third depth can be distinct from each other so that the depth zone Z1 corresponds to the highest surface and the depth zone Z3 corresponds to the lowest of the exposed surfaces of the object stack 404. The surface of the depth zone Z2 can be higher than the surface of the depth zone Z3 and lower than the surface of depth zone Z1. The surface of the depth zone Z3 can be higher than the surface of the pallet 402.

Along with or based on the surface identifications, the robotic system 100 can identify edges and/or corners that may correspond to object boundaries. The edges and/or continuous surfaces represented in the image data and/or sensor data can be identified based on differences in depth measurements and/or image traits (e.g., linear patterns, shadows, or differences in clarity). For example, the robotic system 100 can identify edges using a Sobel filter and/or when points adjacent to a significant change in depth measure (e.g., exceeding a predetermined tolerance threshold) follow a shape template (e.g., a linear pattern).

Additionally, the robotic system 100 can identify open edges and/or open corners (also referred to as exposed edges and exposed corners, respectively). The robotic system 100 can identify the open edges/corners using 2D and/or 3D image data. For example, the robotic system 100 can use the 3D depth measures to identify the open edges/corners that border or define changes in depth measures that exceed the predetermined threshold in conjunction with line segments, derived from 2D image data, that correspond with the changes in the depth measures. Identifying the open edges and the open corners of the objects in the object stack 163 may be useful for grasping the objects using the multi-surface gripper assembly 141 described with respect to FIG. 3. For example, the open edge can be used to determine a candidate grip location since the open edge has a high likelihood of allowing the top pad 141-2 as well as the side pad 141-1 to contact the object. For example, in grasping the object D, the robotic system 100 can leverage the open corner C3 so that the multi-surface gripper assembly 141 can approach and contact a top (horizontal) surface as well as at least one side (vertical) surface of the object D.

In FIG. 4A, the open edge derived from the image or sensor data is represented with a vector (e.g., vector 407 and vector 408) and can extend from a corner in the detection result (e.g., corner C7). The open corner includes two of the open edges that intersect at the open corner. The combination of the open corner and the two exposed edges intersecting at the open corner can be referred to as open corner unit (e.g. the combination of open corner C7, vector 407 and vector 408). The open corner unit can be used for generating a detection hypothesis and subsequent processing (e.g., refinement of the position of the object) by the robotic system 100 during detection processes. In contrast to corners between or abutting other objects/surfaces, the open corner can represent a portion of one object (e.g., the object D). In other words, the robotic system 100 can identify that the open corner belongs to one corresponding object with a high degree of certainty given the significant differences in depth measures. As such, the robotic system 100 can use the open corner to derive a minimum viable region (MVR) for the corresponding object, such as when the robotic system 100 is unable to match detection results with registered objects. An MVR may represent minimum and/or optimal area required to contact and lift the corresponding object. Based on the open corners/edges, the MVR may be generated by identifying edges (e.g., 2D and/or 3D edges) that oppose the open edges. The robotic system 100 can derive the MVR by starting from the open corner and following the corresponding open edges to the identified opposing edges. The robotic system 100 can determine the corresponding closed/bounded area as the MVR. In some embodiments, the robotic system 100 can use the bounded area as an initial MVR, which may be further adjusted and/or validated to generate a final MVR.

As an example, in FIG. 4A, object A includes an open corner C1 defined by an open edge 406-1 and an open edge 406-2, both of which are not horizontally abutting another adjacent object/surface at substantially the same height. An open corner, such as the corner C1, can be identified as a vertex defined by two intersecting open edges, such as the edges 406-1 and 406-2. The open edge 406-2 of the object A is located at boundary between the zone Z1 and zone Z3. The edge 406-2 is associated with a boundary or a transition between depth values that correspond to (1) the top surface of the object A on the depth zone Z1 and (2) the top surface of the depth zone Z3 corresponding to a supporting layer. A region corresponding to the top surface of the object A can be a quadrant bound by the two intersecting exposed edges 406-1 and 406-2 with the exposed corner C1 as the origin. The remaining portions can have a different depth value, such as a depth value corresponding to the top surface of the subsequent layer of objects in the object stack.

FIG. 4A further includes illustrations for a degree/measure of openness (e.g., arcs associated with corners C4, C5, and C6 of the objects C and D). A degree of openness refers an amount of unobstructed space around a feature, such as the open edge or open corner. In some embodiments, the degree of openness can be a parameter that can be derived from the image and sensing data to indicate whether another object is within a distance of the feature in 2D space and/or 3D space. As an example, in FIG. 4A, the robotic system 100 can determine that the corner C4 is open (e.g., having no adjacent features of other objects at or about the same height) along the horizontal direction with a degree of openness represented by a horizontal openness distance D1. Also, the degree of openness of corner C4 of the object C is illustrated with two adjacent arcs, which indicates the degree of openness in the horizontal (2D) region radially around corner C4. For example, the degree of openness associated with the corner C4 of the object C illustrated with two arcs is greater than the degree of openness associated with the corner C5 of the object C illustrated with a single arc due to its proximity to object D. The horizontal distance as exemplified by horizontal openness distance D1 can also be associated with a measure or degree of a horizontal plane openness corresponding to the open edges. For example, a vector along horizontal openness distance D1 and the open edge, such as open edge 406-1 or 406-2, can form a horizontal plane that can represent the measure or degree of openness between the open edge and any adjacent objects in the horizontal direction. In some embodiments, the robotic system 100 can set a limit to which horizontal openness distance D1 is measured such that horizontal openness distance D1 can have a maximum distance, which for example can be set as a maximum length corresponding to the maximum possible object size for an object that can be in the object stack.

FIGS. 4A and 4B also illustrate threshold distances (e.g., distances D2, D3, and D4). The threshold distance D2 (also referred to as a "width threshold distance") in FIG. 4A refers to a width along the side surfaces of the object (e.g. object D) for contact with the side pad 141-1 in FIG. 3 in order to form a sufficiently large contact area to grip the object, and more specifically to accommodate the width of the side pad 141-1. The threshold distance D4 (also referred to as a "height threshold") in FIG. 4B refers to a minimum height along the side surface of the object (e.g., object D) for contact with the side pad 141-1 to form a sufficiently large contact area to grip the object. For example, the side of object D that is adjacent to object E does not meet threshold distance D4 since the side pad 141-1 would likely collide with the top of object E, however, the side of object D opposite of object E would meet threshold distance D4 since there are no objects to cause a collision in the vertical direction with the side pad 141-1. The threshold distance D3 (also referred to as an "approach threshold") in FIG. 4A refers to a clearance distance required by the gripped pad in approaching and contacting the side surface of the object (e.g., object D). The threshold distance D3 may correspond to the minimum amount of space to accommodate the side pad 141-1 in the most compact configuration, such as when the side pad 141-1 is most retracted. The threshold distance D3 may be used to confirm that sufficient space is available for the side pad 141-1 to approach the side surface of the object D in a horizontal, vertical, and/or diagonal approach trajectory. The robotic system 100 can use a combination of the degree of openness and the threshold distances D2, D3, and D4 for an object to determine which, if any, of the edges and corners of the object can be approached and gripped by the multi-surface gripper assembly 141.

In some embodiments, the vertical distance as exemplified by a vertical openness distance D5 can also be associated with a measure or degree of a vertical plane openness corresponding to the open edges. For example, a vector along the vertical openness distance D5 and the open edge 406-3 of object B, can form a vertical plane that can represent the measure or degree of openness between the open edge and any adjacent objects in the vertical direction. In some embodiments, the robotic system 100 can set a limit to which vertical openness distance D5 is measured such that vertical openness distance D5 can have a maximum distance, which for example can be set as a maximum length corresponding to the maximum possible object size for an object that can be in the object stack.

Figure 5:
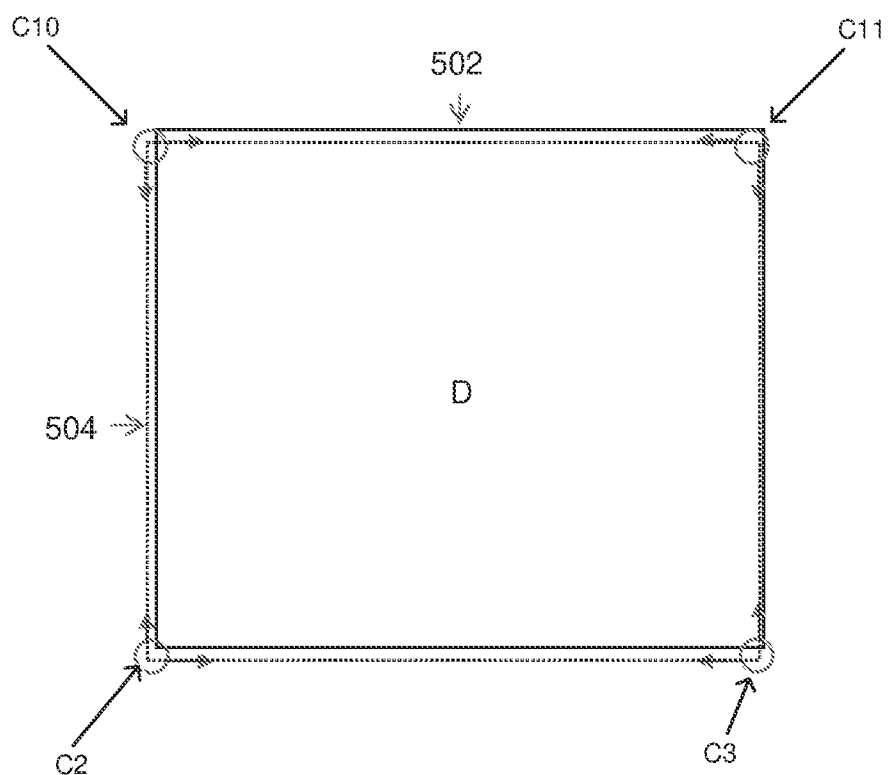
FIG. 5 illustrates a detected pose and a refined pose for an object in accordance with one or more embodiments of the present technology.

FIG. 5 illustrates a detection hypothesis and a hypothesis refinement for an object. The robotic system 100 of FIG. 1 can select one or more of the open corner units as a refinement unit. As exemplified in FIG. 5, for the detection hypothesis corresponding to object D, the refinement unit corresponds to the four open corner units, including C2, C3, C10, and C11. As described above, the robotic system 100 can generate the detection hypothesis based on a stored template representing the object. In FIG. 5, the robotic system 100 has generated the detection hypothesis corresponding to object D that includes the edges 502 as illustrated with a solid line. However, the stored template may differ slightly from the actual object. Thus, in order to increase the accuracy of the detection, the robotic system 100 may generate the hypothesis refinement which can refine the pose, location, and/or dimensions of the objects. As shown by refined edges 504 (which correspond with the actual position of object D according to the sensor information, and in particular, the point cloud information corresponding to object D) illustrated with a dashed line, the robotic system 100 can generate the hypothesis refinement for object D that adjusts the position and dimensions of the detection hypothesis for object D to align one or more of the edges and corners of the detection hypothesis with the refined edges 504.

In some embodiments, the robotic system 100 can generate the hypothesis refinement by applying various algorithms according to the refinement units. For example, the robotic system 100 can refine the pose, orientation, size, and/or position of the detection hypothesis using iterative closest point refinement (ICP), which seeks to minimize the difference between two clouds of points, or singular value deposition (SVD) on the refinement unit and the detection hypothesis to generate the hypothesis refinement. The hypothesis refinement can be generated using the refinement unit that includes a single open corner unit. However, the accuracy of the hypothesis refinement may be improved by applying the algorithms to the refinement unit that includes two or more of the open corner units. The use of the side pad 141-1 requires a distance tolerance, which in some embodiments can be one centimeter or less, to position the side pad 141-1 close enough to the target object to provide sufficient suction to secure the object against the side pad 141-1. However, the side pad 141-1 may collide with the top of the object or shift the object laterally (which could in turn displace adjacent objects) if the side pad 141-1 is positioned too close to the object. The pose refinement of the detection hypothesis for objects provides the benefit of increasing the accuracy and precision of the detection hypothesis by using one or more of the refinement units associated with the object to align the detection hypothesis more closely with the actual position, dimensions, and/or orientation of the objects as they are in the object stack. For example, the pose refinement allows the side pad 141-1 to be positioned within one centimeter or less distance from the target object without colliding with the target object. Thus, when calculating trajectories to grasp the object, the robotic system 100 can use the pose refinement to more precisely position the side pad 141-1 to securely grasp the objects while preventing the side pad 141-1 from colliding with or unplanned displacing of the object.

Transfer Assembly

Figure 6:
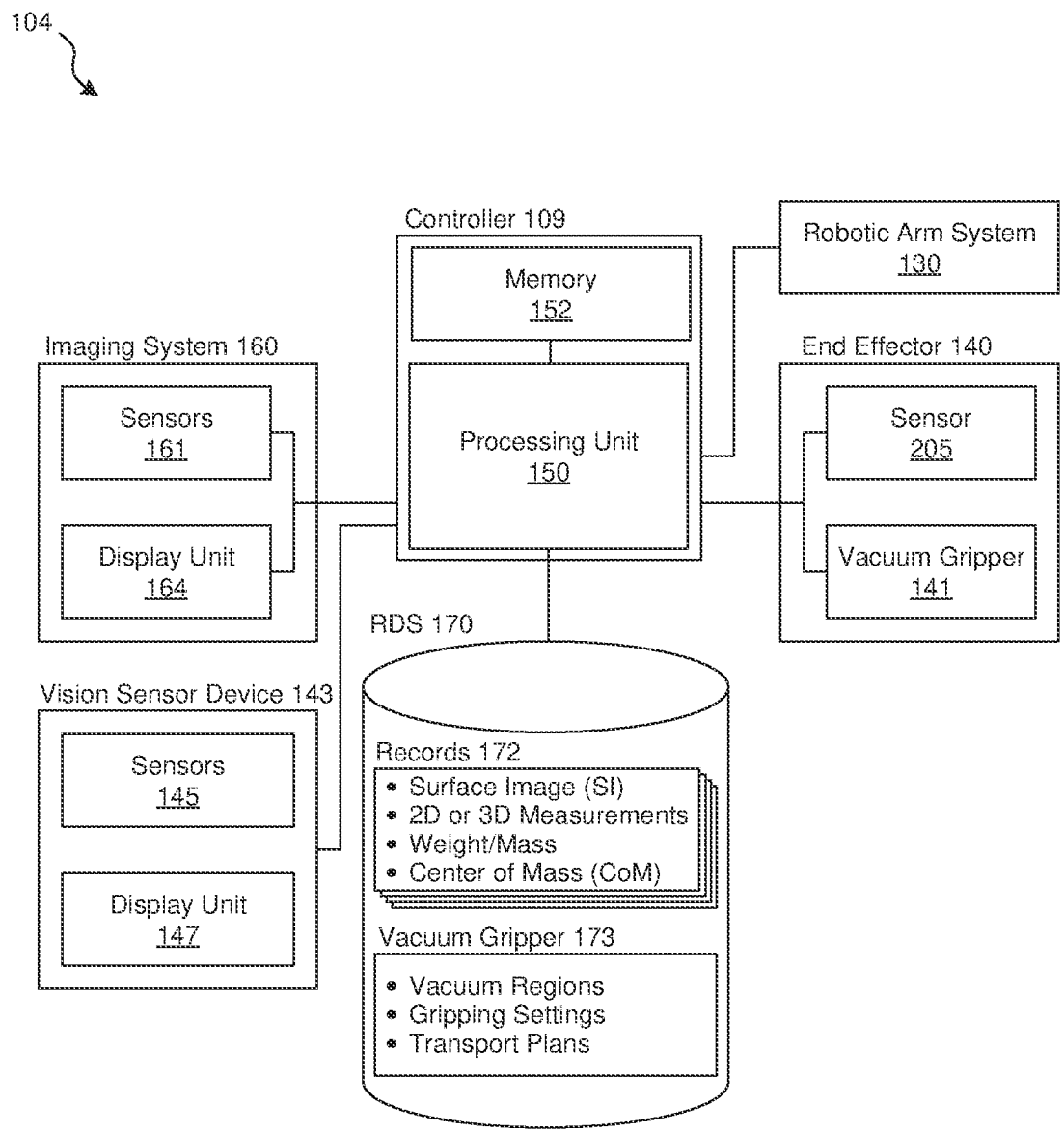
FIG. 6 is a functional block diagram of a robotic transfer assembly in accordance with one or more embodiments of the present technology.

FIG. 6 is a functional block diagram of the transfer assembly 104 in accordance with one or more embodiments of the present technology. A processing unit 150 (PU) can control the movements and/or other actions of the robotic arm system 132. The PU 150 can receive image data from sensors (e.g., sensors 161 of the imaging system 160 of FIG. 3), vision sensors 145 of a vision sensor device 143, or other sensors or detectors capable of collecting image data, including video, still images, lidar data, radar data, or combinations thereof. In some embodiments, the image data can be indicative or representative of a surface image (SI) of the package 112.

The PU 150 can include any electronic data processing unit which executes software or computer instruction code that could be stored, permanently or temporarily, in memory 152, a digital memory storage device or a non-transitory computer-readable media including, but not limited to, random access memory (RAM), disc drives, magnetic memory, read-only memory (ROM), compact disc (CD), solid-state memory, secure digital cards, and/or compact flash cards. The PU 150 may be driven by the execution of software or computer instruction code containing algorithms developed for the specific functions embodied herein. In some embodiments, the PU 150 may be an application-specific integrated circuit (ASIC) customized for the embodiments disclosed herein. In some embodiments, the PU 150 can include one or more of microprocessors, Digital Signal Processors (DSPs), Programmable Logic Devices (PLDs), Programmable Gate Arrays (PGAs), and signal generators; however, for the embodiments herein, the term "processor" is not limited to such example processing units and its meaning is not intended to be construed narrowly. For instance, the PU 150 can also include more than one electronic data processing unit. In some embodiments, the PU 150 could be a processor(s) used by or in conjunction with any other system of the robotic system 100 including, but not limited to, the robotic arm system 132, the end effector 140, and/or the imaging system 160. The PU 150 of FIG. 6 and the processor 202 of FIG. 2 can be the same component or different components.

The PU 150 may be electronically coupled (via, e.g., wires, buses, and/or wireless connections) to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the PU 150 via a physical or a virtual computer port. The PU 150 may be programmed or configured to execute the methods discussed herein. In some embodiments, the PU 150 may be programmed or configured to receive data from various systems and/or units including, but not limited to, the imaging system 160, end effector 140, etc. In some embodiments, the PU 150 may be programmed or configured to provide output data to various systems and/or units.

The imaging system 160 could include one or more sensors 161 configured to capture image data representative of the packages (e.g., packages 112 located on the de-palletizing platform 110 of FIG. 3). In some embodiments, the image data can represent visual designs and/or markings appearing on one or more surfaces of the packages from which a determination of a registration status of the package may be made. In some embodiments, the sensors 161 are cameras configured to work within a targeted (e.g., visible and/or infrared) electromagnetic spectrum bandwidth and are used to detect light/energy within the corresponding spectrum. In some camera embodiments, the image data is a set of data points forming a point cloud, the depth map, or a combination thereof captured from one or more 3D cameras and/or one or more 2D cameras. From these cameras, distances or depths between the imaging system 160 and one or more exposed (e.g., relative to a line of sight for the imaging system 160) surfaces of the packages 112 may be determined. In some embodiments, the distances or depths can be determined by using an image recognition algorithm(s), such as contextual image classification algorithm(s) and/or edge detection algorithm(s). Once determined, the distance/depth values may be used to manipulate the packages via the robotic arm system. For example, the PU 150 and/or the robotic arm system can use the distance/depth values for calculating the position from where the package may be lifted and/or gripped. It should be noted that data described herein, such as the image data, can include any analog or digital signal, either discrete or continuous, which could contain information or be indicative of information.

The imaging system 160 can include at least one display unit 164 configured to present operational information (e.g., status information, settings, etc.), an image of the target package(s) 112 captured by the sensors 161, or other information/output that may be viewed by one or more operators of the robotic system 100 as discussed in detail below. In addition, the display units 164 can be configured to present other information such as, but not limited to, symbology representative of targeted packages, non-targeted packages, registered packages, and/or unregistered instances of the packages.

The vision sensor device 143 can communicate with the PU 150 via wire and/or wireless connections. The vision sensors 145 can be video sensors, CCD sensors, lidar sensors, radar sensors, distance-measuring or detecting devices, or the like. Output from the vision sensor device 143 can be used to generate a representation of the package(s), such as a digital image and/or a point cloud, used for implementing machine/computer vision (e.g., for automatic inspection, robot guidance, or other robotic applications). The field of view (e.g., 30 degrees, 90 degrees, 120 degrees, 150 degrees, 180 degrees, 210 degrees, 270 degrees of horizontal and/or vertical FOV) and the range capability of the vision sensor device 143 can be selected based on the configuration of the multi-surface gripper assembly 141. (FIG. 4 shows an exemplary horizontal FOV of about 90 degrees.) In some embodiments, the vision sensors 145 are lidar sensors with one or more light sources (e.g., lasers, infrared lasers, etc.) and optical detectors. The optical detectors can detect light emitted by the light sources and reflected by surfaces of packages. The presence and/or distance to packages can be determined based on the detected light. In some embodiments, the vision sensors 145 can scan an area, such as substantially all of a vacuum gripping zone. For example, the vision sensors 145 can include one or more deflectors that move to deflect emitted light across a detection zone. In some embodiments, the vision sensors 145 are scanning laser-based lidar sensors capable of scanning vertically and/or horizontally, such as a 10° lidar scan, a 30° lidar scan, a 50° lidar scan, etc.). The configuration, FOV, sensitivity, and output of the vision sensors 145 can be selected based on the desired detection capabilities. In some embodiments, the vision sensors 145 can include both presence/distance detectors (e.g., radar sensors, lidar sensors, etc.) and one or more cameras, such as 3D or 2D cameras. Distances or depths between the sensors and one or more surfaces of packages can be determined using, for example, one or more image recognition algorithms. The display 210 can be used to view image data, view sensor status, perform calibration routines, view logs and/or reports, or view other information or data, such as, but not limited to, symbology representative of targeted, non-targeted, registered, and/or unregistered instances of packages 112.

To control the robotic system 100, the PU 150 can use output from one or both of the vision sensors 145 and sensors 161. In some embodiments, image output from sensors 161 is used to determine an overall transfer plan, including an order for transporting objects. Image output from the vision sensors 145, as well as sensors 205 (e.g., a force detector assembly), can be used to position a multi-gripping assembly with respect to objects, confirm object pickup, and monitor transport steps.

With continued reference to FIG. 6, the RDS 170 could include any database and/or memory storage device (e.g., a non-transitory computer-readable media) configured to store the registration records 172 for a plurality of the packages 112, data 173 for vacuum grippers. For example, the RDS 170 can include read-only memory (ROM), compact disc (CD), solid-state memory, secure digital cards, compact flash cards, and/or data storage servers or remote storage devices.

In some embodiments, the registration records 172 can each include physical characteristics or attributes for the corresponding target package 112. For example, each registration record 172 can include, but is not be limited to, one or more template SIs, vision data (e.g., reference radar data, reference lidar data, etc.), 2D or 3D size measurements, a weight, and/or CoM information. The template SIs can represent known or previously determined visible characteristics of the package including the design, marking, appearance, exterior shape/outline, or a combination thereof of the package. The 2D or 3D size measurements can include lengths, widths, heights, or a combination thereof for the known/expected packages.

In some embodiments, the RDS 170 can be configured to receive a new instance of the registration record 172 (e.g., for a previously unknown package and/or a previously unknown aspect of a package) created in accordance with the embodiments disclosed below. Accordingly, the robotic system 100 can automate the process for registering the packages 112 by expanding the number of registration records 172 stored in the RDS 170, thereby making a de-palletizing operation more efficient with fewer unregistered instances of the packages 112. By dynamically (e.g., during operation/deployment) updating the registration records 172 in the RDS 170 using live/operational data, the robotic system 100 can efficiently implement a computer-learning process that can account for previously unknown or unexpected conditions (e.g., lighting conditions, unknown orientations, and/or stacking inconsistencies) and/or newly encountered packages. Accordingly, the robotic system 100 can reduce the failures resulting from "unknown" conditions/packages, associated human operator interventions, and/or associated task failures (e.g., lost packages and/or collisions).

The RDS 170 can include vacuum gripper data 173, including, but not limited to, characteristics or attributes, including the number of addressable vacuum regions, carrying capability of a vacuum gripper device (e.g., multi-gripper assembly), vacuum protocols (e.g., vacuum levels, airflow rates, etc.), or other data used to control the robotic arm system 130 and/or end effector 140. An operator can input information about the vacuum gripper installed in the robotic arm system 130. The RDS 170 then identifies vacuum gripper data 173 corresponding to the vacuum gripper device for operation. In some embodiments, the vacuum gripper device (e.g., the multi-surface gripper assembly 141 of FIG. 3) is automatically detected by the robotic arm assembly 139, and the RDS 170 is used to identify information about the detected vacuum gripper device. The identified information can be used to determine settings of the vacuum gripper device. Accordingly, different vacuum gripper devices or multi-gripper assemblies can be installed and used with the robotic arm system 130.

Multi-Surface Gripper Assembly

Figure 7A:
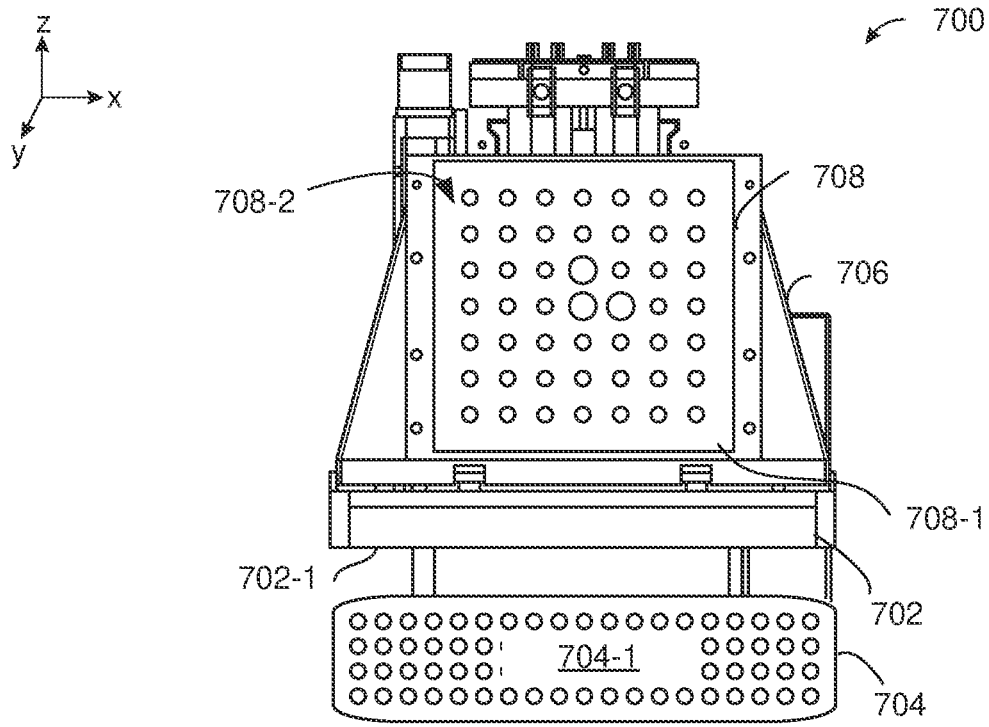
FIGS. 7A-7E, 8A-8F, and 9A-9F illustrate an example end effector in accordance with one or more embodiments of the present technology.
Figure 7B:
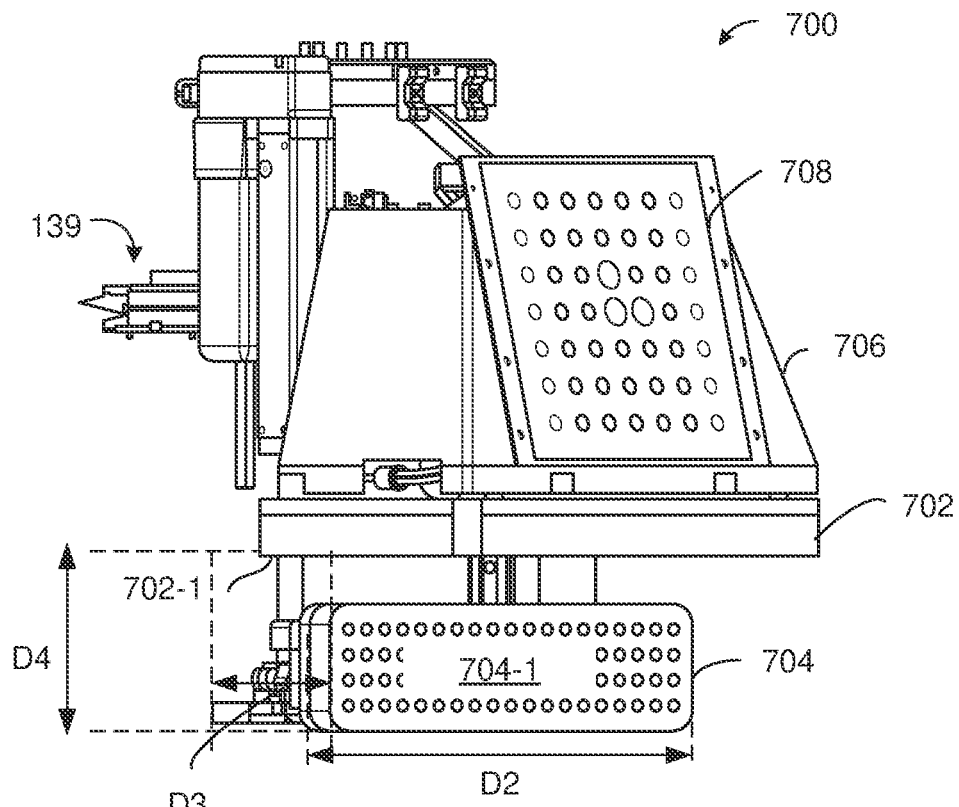
Figure 7C:
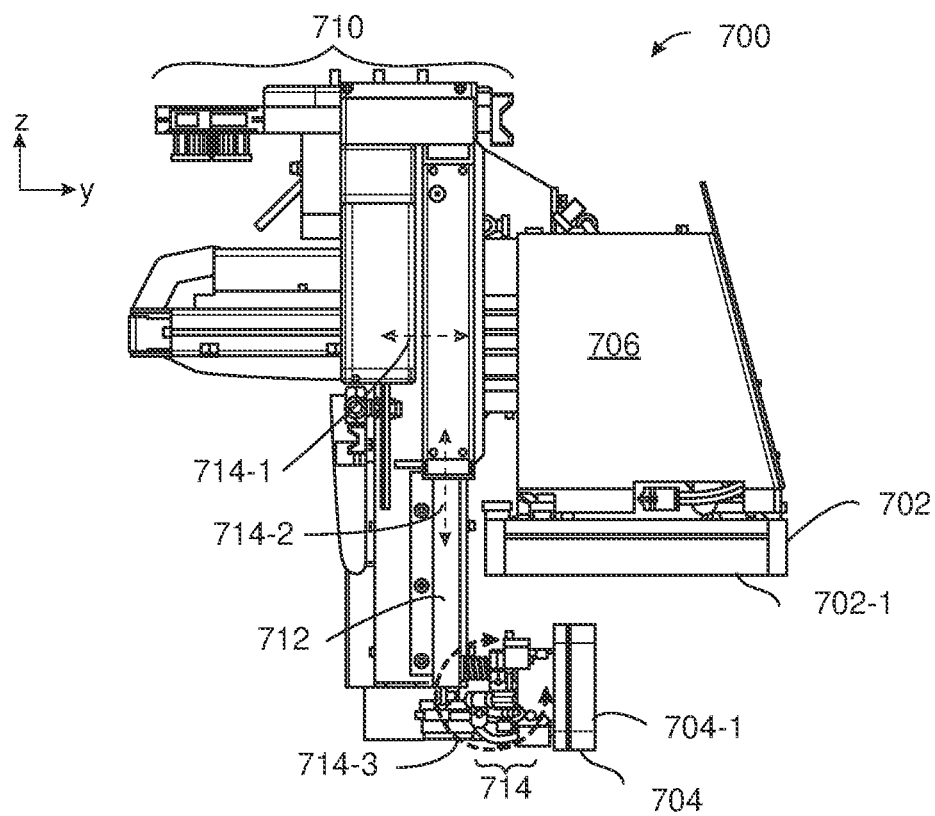
Figure 7D:
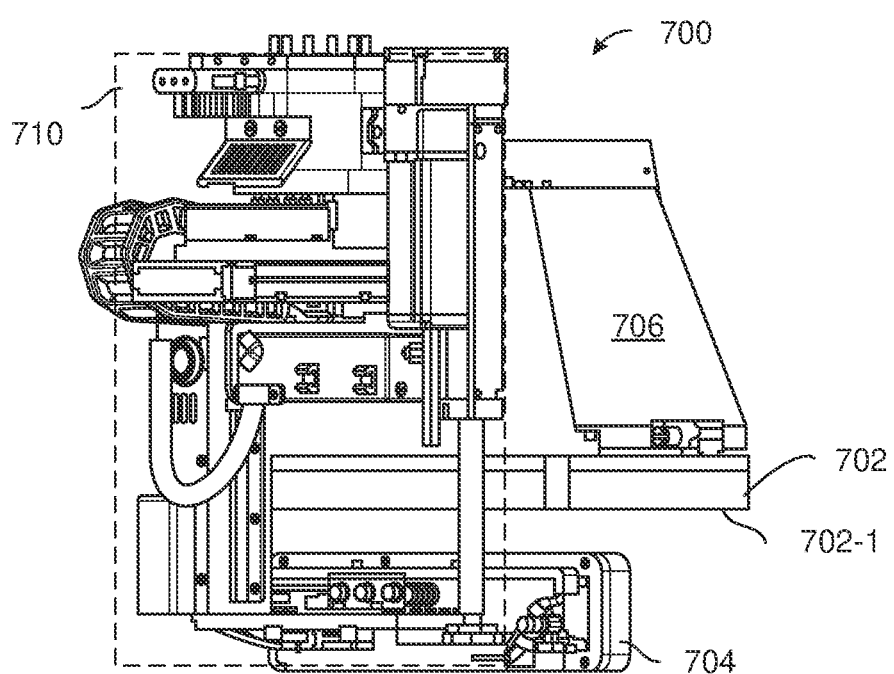
Figure 7E:
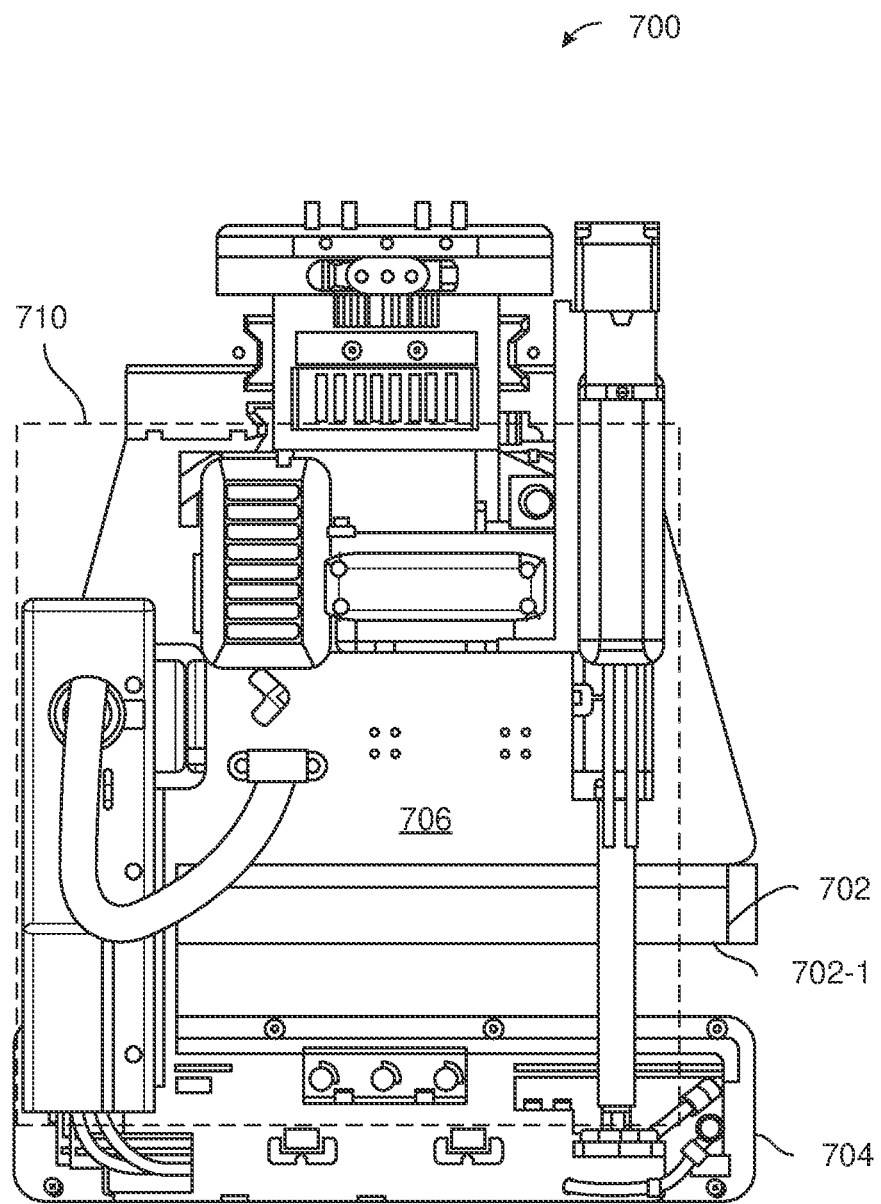
Figure 8A:
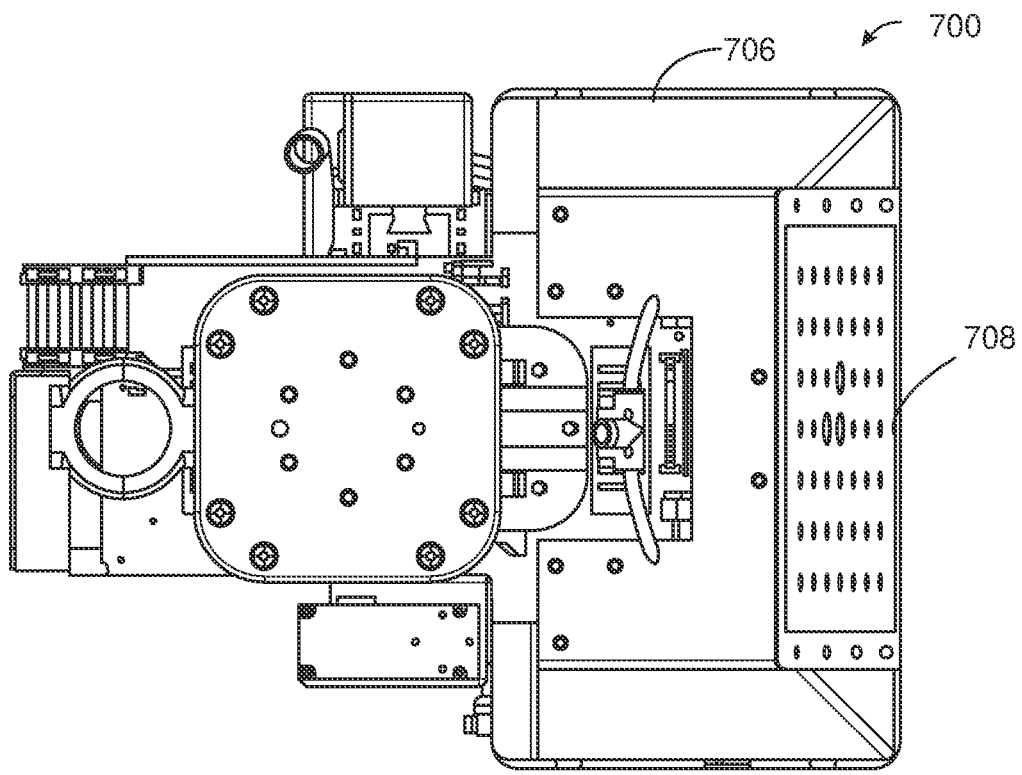
Figure 8B:
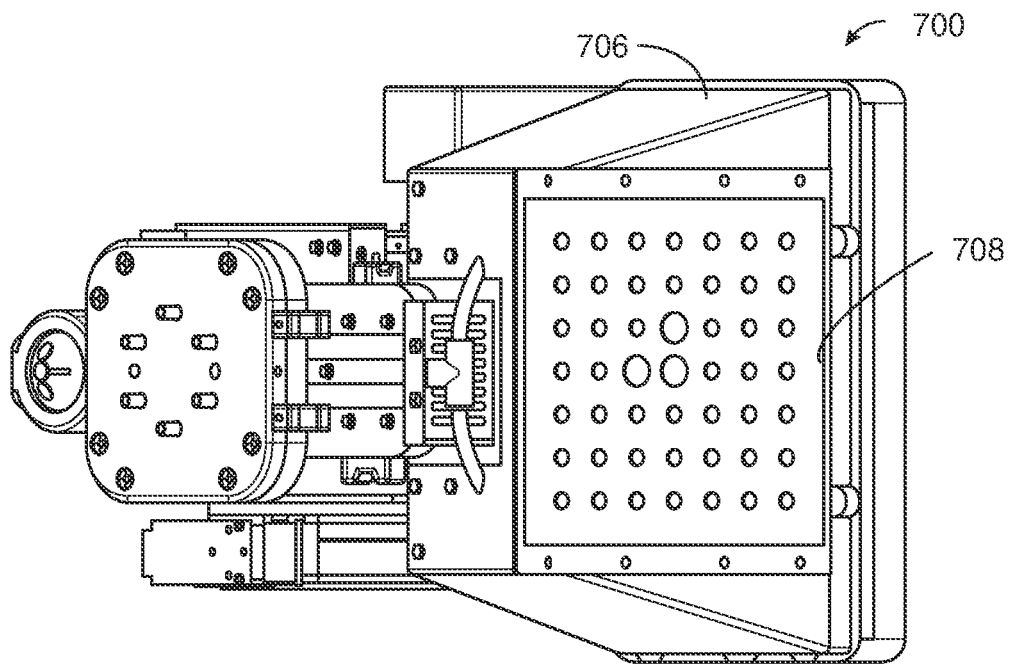
Figure 8C:
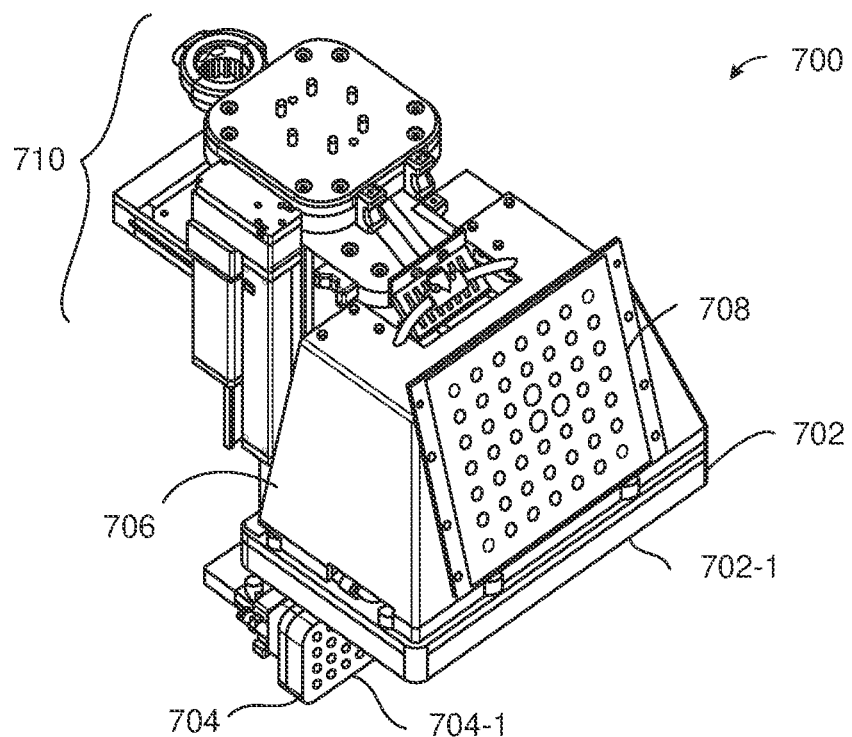
Figure 8D:
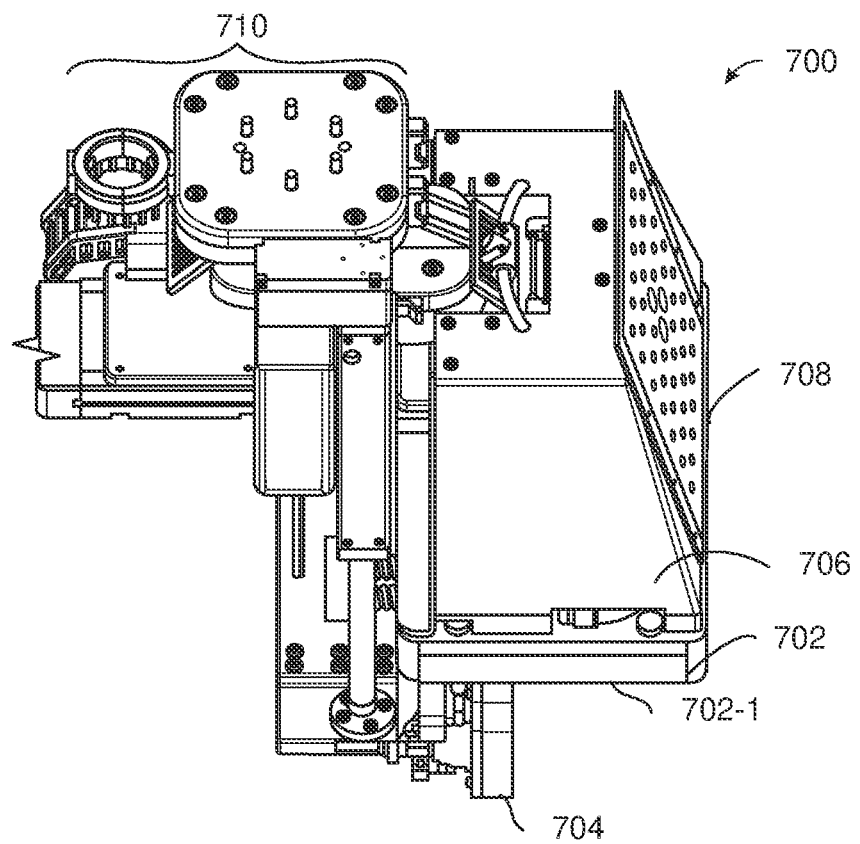
Figure 8E:
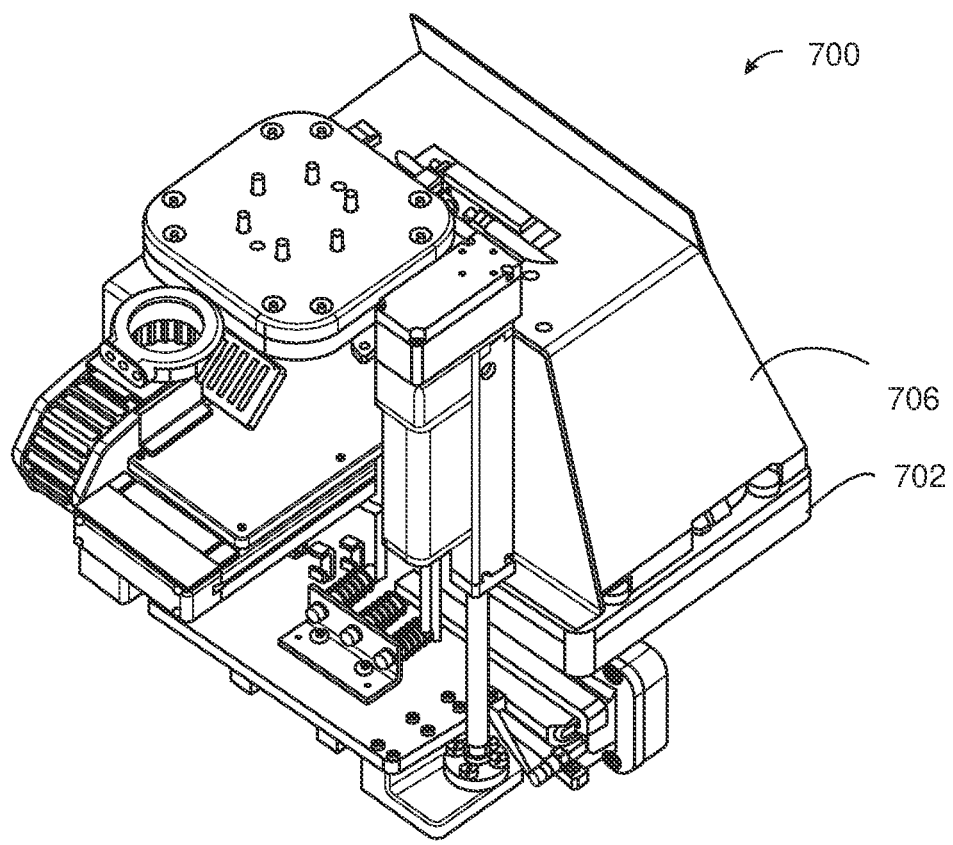
Figure 8F:
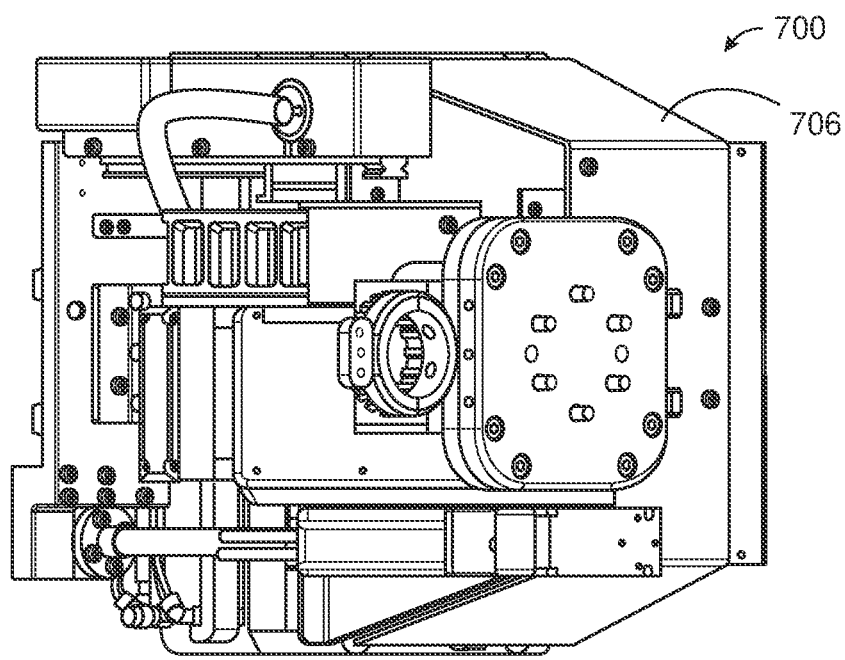
Figure 9A:
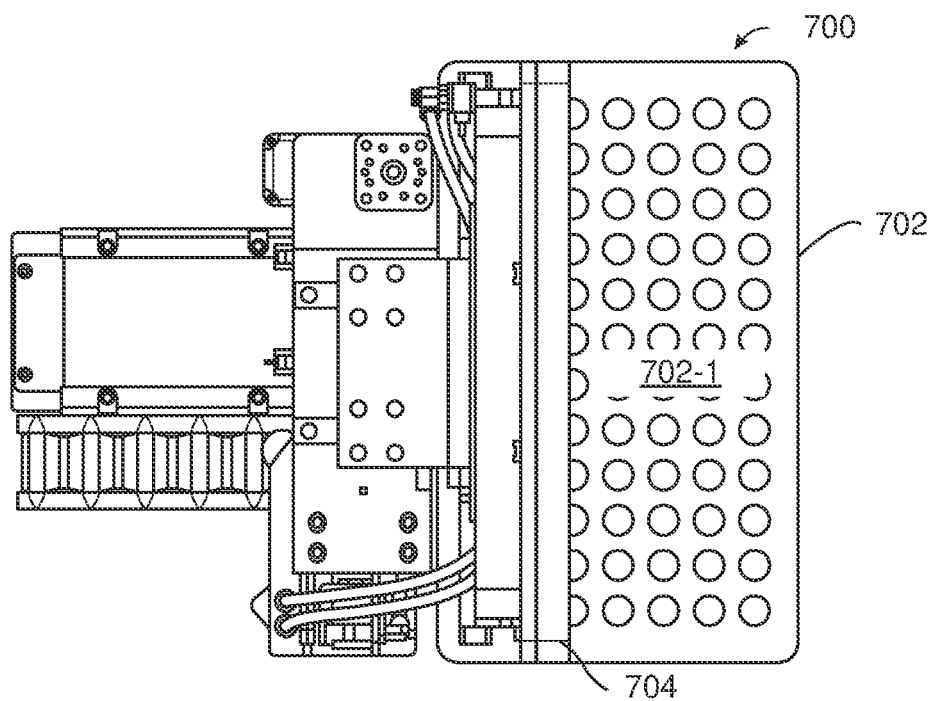
Figure 9B:
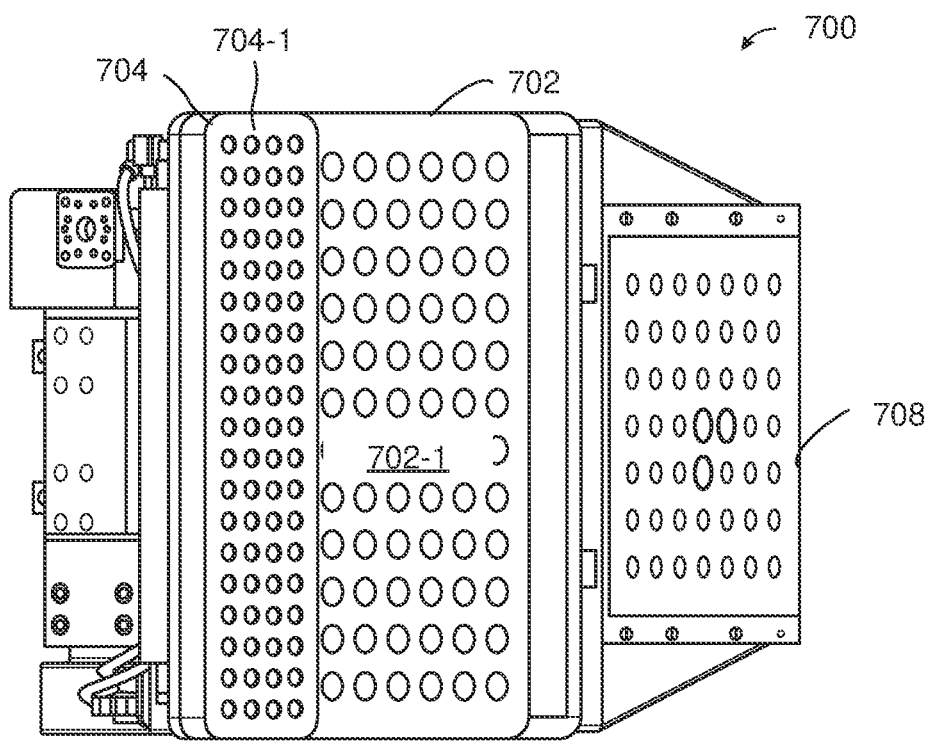
Figure 9C:
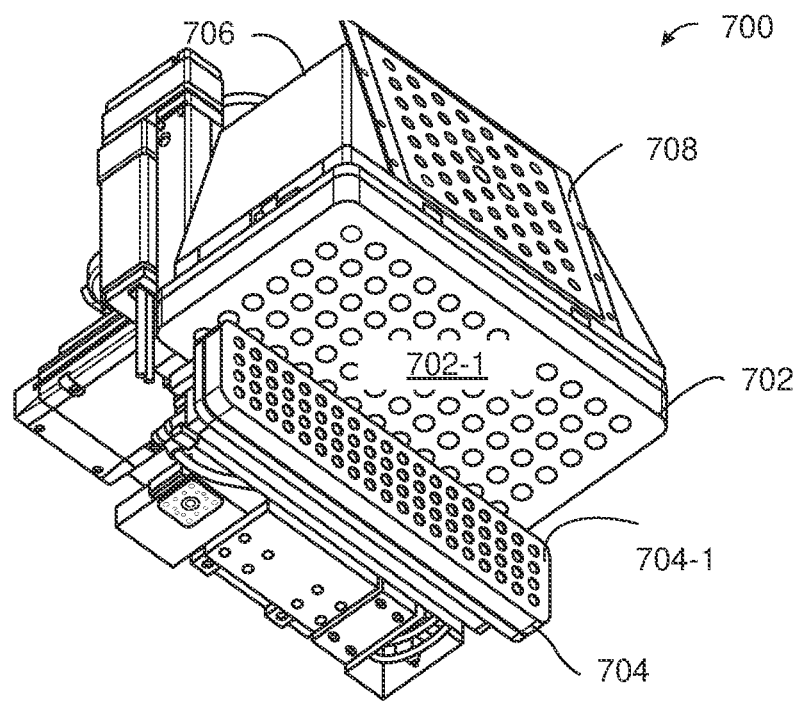
Figure 9D:
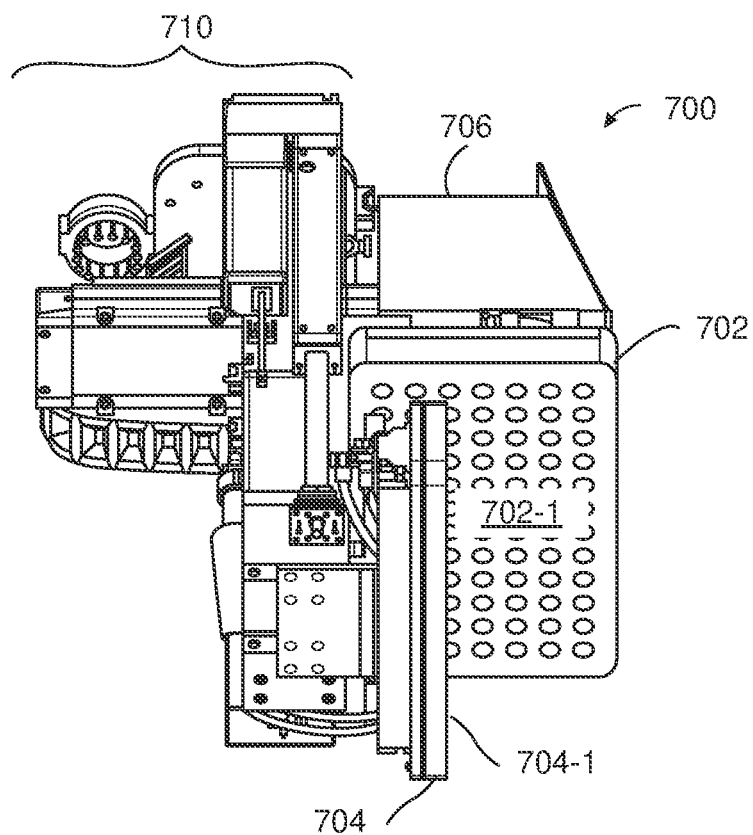
Figure 9E:
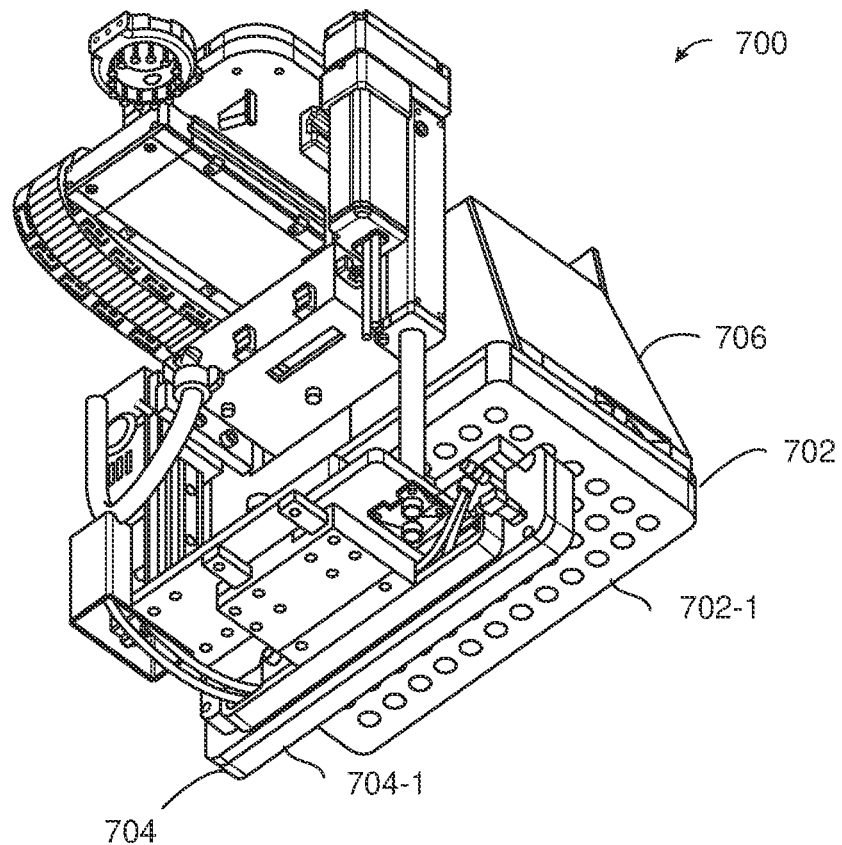
Figure 9F:
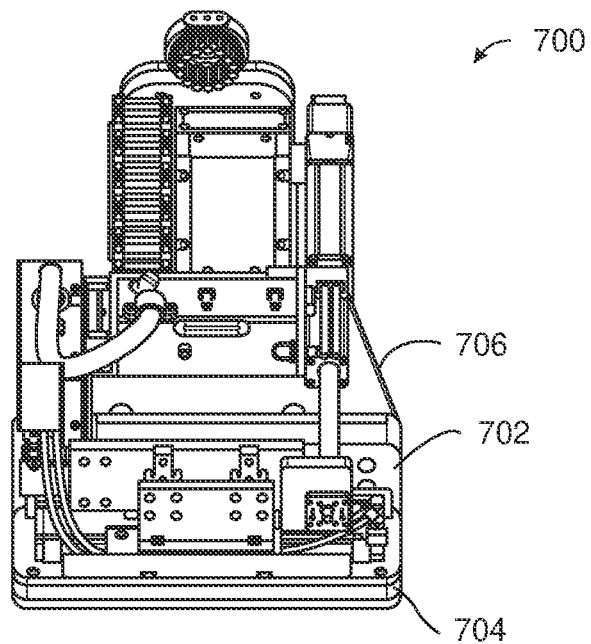

FIGS. 7A-7E, 8A-8F, and 9A-9F illustrate an example end effector (e.g., a multi-surface gripper assembly 700) in accordance with one or more embodiments of the present technology. FIG. 7A illustrates a front view, FIG. 7C illustrates a side view, and FIG. 7E illustrates a back view of the multi-surface gripper assembly 700, with FIGS. 7B and 7D illustrating views from an angle between the front and side views or between the side and back views. FIG. 8A illustrates a top view of the multi-surface gripper assembly 700, and FIGS. 8B-8F illustrate a first set of perspective views (e.g., from above) rotating around the multi-surface gripper assembly 700, such as by successively rotating the point of view by 45 degrees between figures. FIG. 9A illustrates a bottom view of the multi-surface gripper assembly 700, and FIGS. 9B-9F illustrate a set of bottom perspective views (e.g., from below) rotating around the multi-surface gripper assembly 700, such as by successively rotating the point of view by 45 degrees between figures.

Referring now to FIGS. 7A-7E, 8A-8F, and 9A-9F together, the end effector may include the multi-surface gripper assembly 700 that is operably couplable to the robotic arm (e.g., robotic arm assembly 139 described with respect to FIG. 3, partially shown in FIG. 7B). In some embodiments, the multi-surface gripper assembly 700 corresponds to the end effector 140 described above with respect to FIGS. 3-5. The multi-surface gripper assembly 700 can include at least two gripping apparatuses that are positioned non-parallel to each other (e.g., a top pad 702 and a side pad 704). The multi-surface gripper assembly 700 may be configured to grasp the target object (also referred to as the "target package") based on concurrently contacting, grasping, and/or supporting multiple surfaces of the target object. In some embodiments, the two pads 702 and 704 are substantially perpendicular to each other. For example, an angle defined by the two pads may be between 70 degrees to 110 degrees to form an 'L' shaped structure configured to contact, grasp, and/or support orthogonal surfaces (e.g., a top surface and one or more side surfaces) of the target object.

The multi-surface gripper assembly 700 can include a top-contacting pad (the top pad 702) having a top interface (e.g., top interface 702-1) configured to contact and/or grasp a top/lateral surface of the target object. The multi-surface gripper assembly 700 can further include a side-contacting pad (the side pad 704) having a side interface (e.g., side interface 704-1) configured to contact and/or grasp a side/peripheral/vertical surface of the target object. One or more of the pads and/or interfaces can be configured to grasp the object as described above, such as using vacuum forces and/or grip regions. In some embodiments, the top pad 702 has a larger surface area than the side pad 704 and/or at least one dimension of the top pad 702 is greater than any of the dimensions of the side pad 704. For example, a width of the top pad 702 may be greater than a width of the side pad 704, or a length of the top pad 702 may be greater than a length of the side pad 704. Alternatively, the top pad 702 and the side pad 704 may have substantially the same surface areas (i.e., similar lengths and widths) for contacting the target object.

The top pad 702 can be attached to a bottom portion of a housing structure (e.g., a housing 706) of the multi-surface gripper assembly 700. The top interface 702-1 can face downward. The side pad 704 can also be coupled to the housing 706. The side interface 704-1 can face a direction (e.g., a lateral direction) orthogonal to the facing direction of the top interface. The top interface 702-1 and the side interface 704-1 can face each other inward so that the top interface 702-1 can contact a top surface of an object (e.g., a box) and the side interface 704-1 can contact an orthogonal side surface of the object.

The side pad 704/side interface 704-1 can increase the grasping force or adhesion between the grasped object and the end effector. Additionally, the robotic system can orient the multi-surface gripper assembly 700 with the side interface 704-1 facing a direction of movement during a transfer of the grasped object. Accordingly, the contact and/or the grasp between the side interface 704-1 and the grasped object can provide additional support against one or more forces, such as inertia or other peeling forces, that reduce or detract from the grasping force. The additional support/grip can be leveraged to increase the transfer speed since the increased forces may be negated by the increased support/grip. The increased transfer speed can reduce the transfer duration without increasing the loss rate. The additional grasp provided by the side interface 704-1 can further reduce damages to the grasped package (e.g., rips or tears in the packaging material/cover) and particularly to the top surfaces of the grasped package, such as when grasping heavier objects and/or objects with softer/delicate package surface material.

In some embodiments, the robotic system can include the side pad 704 at a predetermined retracted position. For example, the robotic system can place the side pad 704 adjacent to the top pad 702 with a bottom portion of the side pad 704 coplanar with or above the top interface 702-1. Accordingly, the robotic system can retain the side pad 704 in the retracted position and prevent the side pad 704 from contacting objects or structures below the top interface. Based on the retracted position, the robotic system can selectively deploy and use the side pad 704. For example, the robotic system can retain the side pad 704 when the targeted spatial optimization or requirement (e.g., tight packing or special object arrangements) prevents the use of the side pad 704, such as due to potential collisions. The robotic system can calculate the potential reduction in time by comparing the duration necessary to place and/or grasp with the side interface to the corresponding reduction in the transfer duration. In some embodiments, the robotic system can deploy and use the side pad 704/side interface 704-1 when the reduction in transfer duration exceeds the time necessary to place and/or grasp the targeted object with the side interface.

In some embodiments, the side pad 704 may be fixed relative to the top pad 702. In other embodiments, the side pad 704 can be coupled via a side positioning mechanism (e.g., side position mechanism 710 shown in FIGS. 7C-7E) configured to selectively position the side pad 704 relative to the top pad 702 and/or the target object. For example, the side positioning mechanism 710 can include a set of rails (e.g., rail 712 in FIG. 7C) and/or rotatable joints (e.g., rotatable joints 714). Accordingly, the side positioning mechanism can move the side pad 704 along a vertical direction (e.g., along the z-axis) and/or along one or more horizontal/lateral directions (e.g., along the x-axis and/or the y-axis), as indicated by dashed arrows 714-1 and 714-2. In some embodiments, the side positioning mechanism may rotate/adjust the orientation of the side pad 704 (e.g., the angle between the side interface and the top interface) using the rotatable joints such that the side interface 704-1 can be tilted upwards to face towards the top interface 702-1 or tilted downwards to face away from the top interface 702-1, as indicated by dashed arrow 714-3. The side positioning mechanism can include pneumatic control mechanisms and/or electric control mechanisms (e.g., motors, actuators, or the like) configured to adjust the pose of the side pad 704 relative to the top pad 702.

The top interface 702-1 and/or the side interface 704-1 may be arranged at predetermine poses relative to a reference or calibration board (e.g., calibration board 708). The calibration board 708 can be used to, for example, calibrate the position of the multi-surface gripper assembly 700 relative to a sensor device (e.g., the imaging system 160 and/or the vision sensor device 143 shown in FIG. 6). In some embodiments, the calibration board 147 can be a placard with a pattern or design used for calibrating or defining the position of the end effector 140 or gripper assembly 141 within the operating environment, position of the robotic arm assembly 139, or a combination thereof. The calibration board 708 can include a structure (e.g., structure 708-2 on calibration board 708 including a plurality of reference dots arranged in a pattern) that may be used to visually identify or locate the end effector assembly. In some embodiments, a bottom portion or edge of the calibration board 708 (e.g., edge 708-1 of calibration board 708) may be coplanar along a vertical plane with a peripheral edge or surface of the top interface. Also, the side interface 704-1 can be configured to contact a surface of the target object located opposite or facing away from the calibration board 708.

Grip Interface

Figures 10A, 10B:
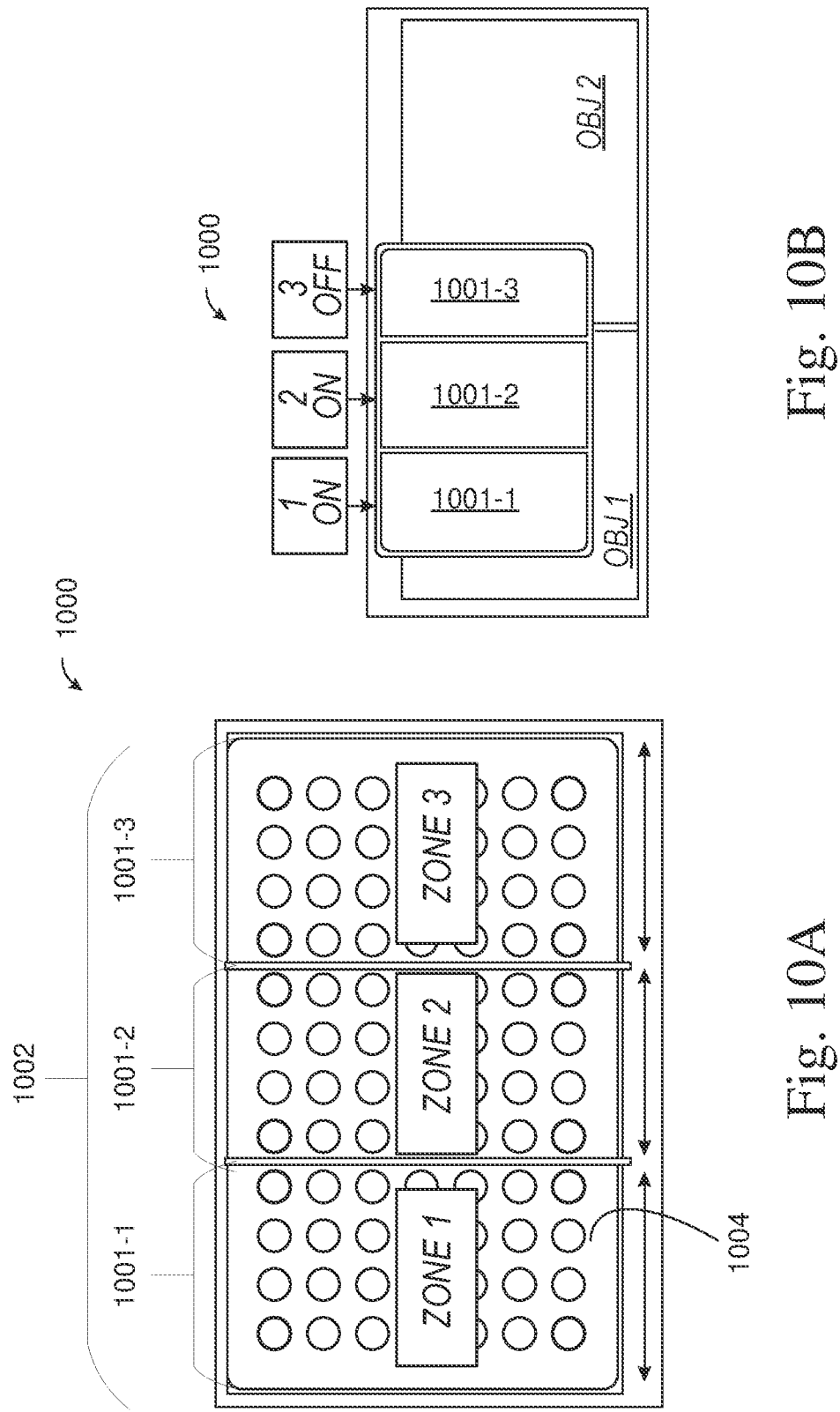
FIGS. 10A-10B illustrate a first example grip interface in accordance with one or more embodiments of the present technology.

FIGS. 10A-10B illustrate a first example grip interface 1000 in accordance with one or more embodiments of the present technology. In some embodiments, the grip interface 1000 corresponds to the top interface 702-1 and/or the side interface 704-1 of multi-surface grip assembly 700 described with respect to FIGS. 7A-9F. FIG. 10A illustrates a front view of the grip interface 1000. FIG. 10B illustrates an implementation example of the grip interface 1000.

In some embodiments, grip interface 1000 can include suction elements 1004 configured to provide gripping/adhering force (e.g., vacuum force) for grasping the target object. For example, suction elements 1004 include suction tubes, suction cups, and/or sealing members. The suction elements 1004 may be grouped into regions or zones (e.g., vacuum regions 1001-1, 1001-2, 1001-3 collectively called vacuum regions 1001) defining a gripping zone 1002. Each grouped vacuum region 1001 may be operated (e.g., engaged or disengaged) independently. For the example illustrated in FIG. 10A, the grip interface 1000 can have rectangular-shaped vacuum regions 1001 arranged adjacent or side-by-side (e.g., grip region 1001-2 is adjacent to grip regions 1001-1 and 1001-3). For the example illustrated in FIG. 10B, the multi-surface gripper assembly 700 may be positioned with zones 1 and 2 overlapping a targeted object (object 1). The robotic system can activate the overlapped zones (e.g., zones 1 and 2) to grip the targeted object. The robotic system can deactivate or not engage the non-overlapped zone and/or any zones that overlap non-targeted objects.

Figure 11A:
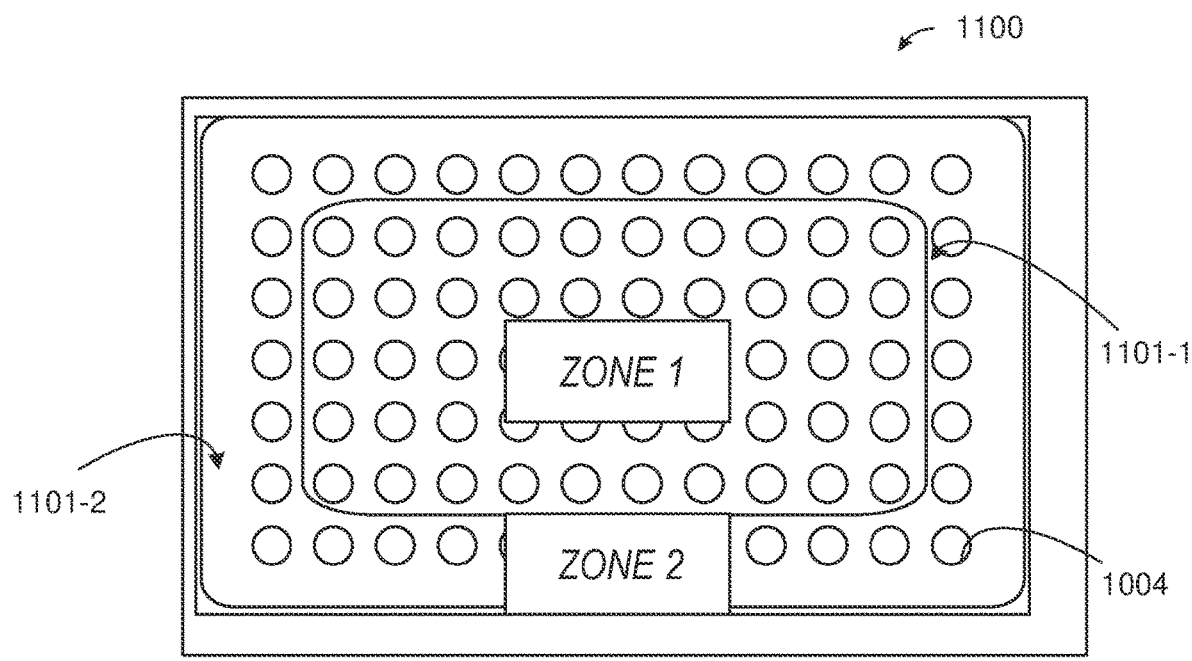
FIGS. 11A-11C illustrate a second example grip interface in accordance with one or more embodiments of the present technology.
Figure 11B:
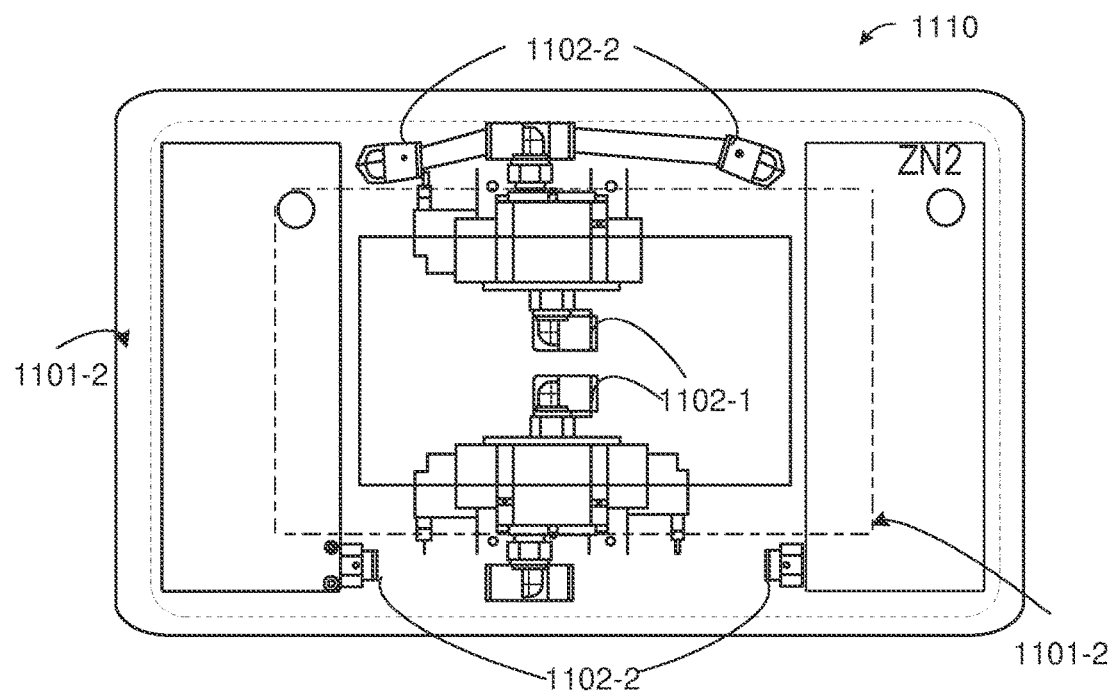
Figure 11C:
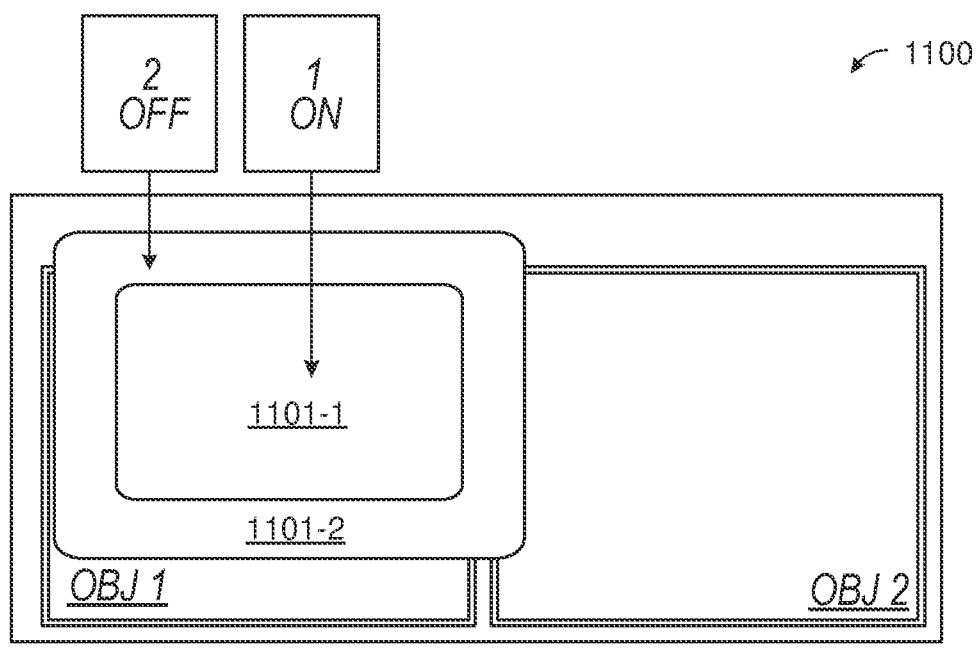

FIGS. 11A-11C illustrate a second example of a grip interface 1100 in accordance with one or more embodiments of the present technology. In some embodiments, the grip interface 1100 corresponds to the top interface 702-1 of the top pad 702 and/or the side interface 704-1 of the side pad 704 of the multi-surface grip assembly 700 described with respect to FIGS. 7A-9F. FIG. 11A illustrates a front view of the grip interface 1100. In some embodiments, the grip interface 1100 includes suction elements 1004 arranged into concentric vacuum zones or regions (e.g., vacuum regions 1101-1 and 1101-2). Suction elements 1004 of an outer vacuum region (e.g., vacuum zone 2) can surround or encircle an inner vacuum region (e.g., vacuum zone 1). As shown in FIG. 11A, vacuum region 1101-1 is surrounded by vacuum region 1101-2 from all edges of vacuum region 1101-1).

FIG. 11B illustrates a plan view of the grip pad 1110 (e.g., the top pad 702 and/or the side pad 704). The grip interface 1100 described with respect to FIG. 11A corresponds to a surface of the grip pad 1110. The grip pad 1110 can include separate vacuum region controllers (e.g., vacuum region controllers 1102-1 and 1102-2), such as pneumatic control mechanisms, electrical control mechanisms (e.g., motors, actuators, etc.), vacuum line ports, or the like for the independent zones. For example, an inner vacuum region (e.g., vacuum region 1101-1) can include a dedicated set of vacuum region controllers 1102-1 including pneumatic connectors operably connected to the suction elements in the inner zone. Also, an outer vacuum region (e.g., vacuum region 1101-2) can include a separate and dedicated set of vacuum region controllers 1102-2 including pneumatic connectors operably connected to the suction elements in the outer zone.

FIG. 11C illustrates an implementation example of the grip interface 1100. The multi-surface gripper assembly 700 may be positioned with vacuum region 1101-1 fully overlapping a targeted object (object 1). The robotic system can activate the overlapped vacuum region (e.g., vacuum region 1101-1) to grip the targeted object. The robotic system can deactivate or not engage the vacuum region (e.g., vacuum region 1101-2) that does not fully overlap the targeted object and/or any zones that may partially overlap non-targeted objects.

In some embodiments, the top interface 702-1 and/or the side interface 704-1 of the multi-surface grip assembly 700 include suction elements 1004 divided into vacuum regions. For example, the top interface 702-1 and the side interface 704-1 both include suction elements 1004 arranged as described with respect to the grip interface 1000 or the grip interface 1100. In some embodiments, the top interface 702-1 and the side interface 704-1 are different from each other. For example, the top interface 702-1 may have suction elements 1004 arranged as described with respect to the grip interface 1000 or the grip interface 1100 while side interface 704-1 includes only a single region of suction elements 1004. In some embodiments, the side interface 704-1 has a smaller surface area than the top interface 702-1, and thereby only a single vacuum region is necessary. As another example, the top interface 702-1 may have suction elements 1004 arranged as described with respect to the grip interfaces 1000 and 704-1 may have suction elements 1004 arranged as described with respect to the grip interface 1100, or vice versa.

Grasp Set

Figure 12:
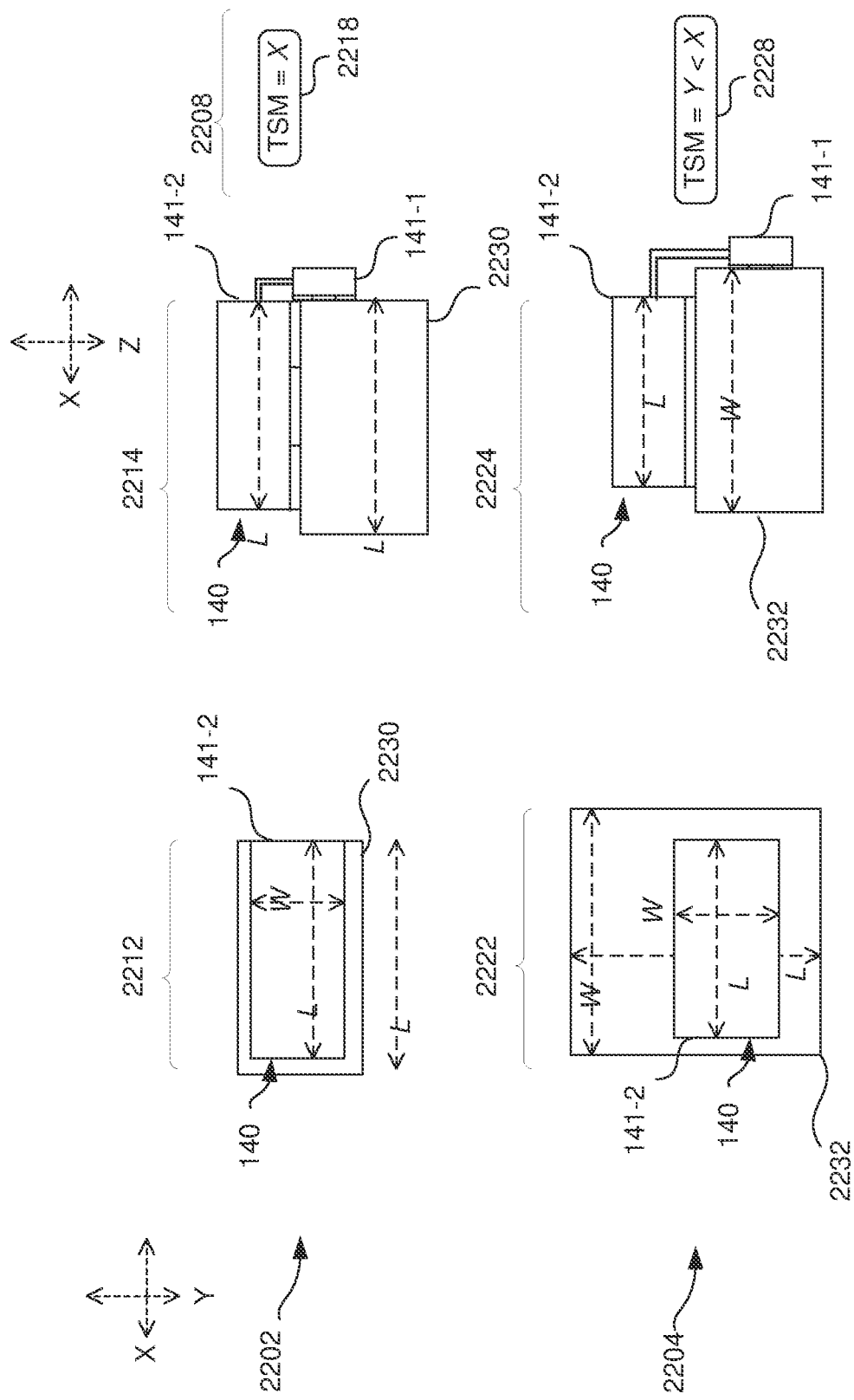
FIG. 12 illustrates example aspects of a grasp set in accordance with one or more embodiments of the present technology.

FIG. 12 illustrates example aspects of a grasp set (also referred to as "object grasp set") in accordance with one or more embodiments of the present technology. In general, the grasp set is a classification or grouping of possible grasps between a specified object and a specified end effector. The grasp set can include one or more grasp models (also referred to as "object grasp model") that describe the relationship between an object and an end effector for gripping the object. More specifically, the grasp model can describe the specific grasp configuration between the end effector and the object, such as the pose, position, and/or orientation of the end effector relative to the object during a grasping operation, as well as information associated with the grasp configuration, such as gripper parameters, grasp stability, and/or movement control parameters. For example, a first grasp model 2202 illustrates a specific grasp configuration between the end effector 140 (e.g. the multi-surface gripper assembly 141 of FIG. 3 and multi-surface gripper assembly 700 of FIG. 7) and a first object 2230 and a second grasp model 2204 illustrates a specific grasp configuration between the multi-surface gripper 141 and a second object 2232.

As an illustrative example of the grasp models, the first grasp model 2202 is illustrated via a first top-view 2212 and a first side-view 2214 representative of the first grasp model 2202 of the end effector 140 for grasping the first object 2203. The first object 2203 may have a smaller or larger footprint than the end effector 140 and be at least partially obscured by the end effector 140 in the first top-view 2212. Accordingly, for the first top-view 2212, the first object 2203 is shown to indicate the pose relative to the end effector 140. Similar to the first grasp model 2202, the second grasp model 2204 is illustrated via a second top-view 2222 and a second side-view 2224 representative of the second grasp model 2204 of the end effector 140 for grasping the second object 2232.

In some embodiments, the robotic system 100 of FIG. 1 can derive each of the one or more grasp models for the grasp set offline (e.g. prior to an object transfer operation) by identifying a possible end effector 140 pose, position, and/or orientation for an object model (e.g. model object corresponding to one of the registered objects in the master data) by overlaying or arranging a model of the end effector 140 relative to the object model. The robotic system 100 can follow a predetermined pattern or routine in arranging and analyzing the object models. The grasp models for the multi-surface gripper assembly 141 can define the pose, position, and/or orientation combinations for both the side pad 141-1 and the top pad 141-2 as well as information associated with the grasp configuration, such as gripper parameters, grasp stability, and/or movement control parameters. As an example, a given pose, position, and/or orientation of the top pad 141-2, can include different vertical positions of the side pad 141-1 and each of the combinations can correspond to a single grasp model. When generating the grasp models, the robotic system 100 can account for the stroke length for the side pad 141-1. For example, although a grip location of the top pad 141-2 over the center of mass relative to the top surface of the object may be optimal for stability during transport of the object, the robotic system 100 may off-set the grip position of the top pad 141-2 to accommodate for the position of the side pad 141-1. More specifically, for larger objects (e.g. boxes with horizontal dimensions great than the maximum stroke length for the side pad 141-1), since the side pad 141-1 can be along the vertical side of the object, the relative position of the side pad 141-1 may limit the horizontal distance the top pad 141-2 can be positioned over the top surface of the object, which may result in the grip location of the top pad 141-2 to be off-set from the center of mass of the object.

In some embodiments, the robotic system 100 can generate the grasp model including the side pad position based on one or more traits of the object, such as a height, a weight, a CoM location, a failure/loss rate, a package surface material, or the like. For example, the robotic system 100 can select a predetermined location or placement rule (e.g., aligned with top or bottom) that places the side pad 141-1 closest to the CoM location. Also, the robotic system 100 can lower the side pad position as a function of the weight and/or the height of the object. Additionally or alternatively, the robotic system 100 may derive different locations or use different derivation rules according to the package surface material.

In some embodiments, the grasp set can include notified grip poses of the end effector 140 with one or more edges/boundaries thereof aligned with one or more corresponding peripheral edges of a package. For example, the notified grip poses can have one or more peripheral edges of the gripping zone 1002 and/or the vacuum regions 1001-1, 1001-2, 1001-3 of FIG. 10 can be aligned with corresponding peripheral edges of the target package 112. In other words, the peripheral edge of the object and the corresponding peripheral edge of the vacuum region can be coincident with a vertical line/plane. In one or more embodiments, the grasp set can be a notified grasp set that includes the notified grasp models without non-aligned end effector grip poses.

In other embodiments, the robotic system 100 can derive the grasp set dynamically, such as when the robotic system 100 does not detect any of the registered objects in the object stack 165 of FIG. 3 (e.g., when the target object does not correspond to a registered object). In the case where the robotic system 100 does not detect the registered objects, the robotic system 100 can generate a grasp set in real-time based on the minimum viable regions (MVR). For example, in generating the grasp set for the MVR, the robotic system 100 can use detection results, such as edge locations and corner locations of the objects, to determine the grip location for the top pad 141-2, relative to the grip surface (e.g., the top surface) of the object. The robotic system 100 can generate the grasp model for the side pad 141-1 with the side pad 141-1 at a default side pad position (also referred to as the default pad position) that is aligned with the top edge of the object.

The grasp set can further include movement control parameters 2208 associated with the grasp models. The movement control parameters 2208 can each include an indication identifying the vacuum regions 1001-1, 1001-2, 1001-3 and/or the suction elements 1004 of FIG. 10 used to grasp the object for the corresponding grasp model. Also, the movement control parameters 2208 can include a value that represents a speed, an acceleration, a force, a rate, an adjustment thereto, or the like used to control the movement of the end effector 140 while grasping and transferring the object (e.g. the target package 112). For example, the movement control parameters 2208 can include a transfer speed multiplier (TSM) for each of the grasp models (e.g., a first TSM 2218 for the first grasp models 2202 and a second TSM 2228 for the second grasp model 2204). The TSM can include a value in the range $R \in [0,1]$, wherein '1' represents full or maximum speed and '0' represents stop or no movement.

The robotic system 100 can derive or calculate (offline and/or dynamically) the movement control parameters 2208 according to the corresponding grasp models. The robotic system 100 can derive the movement control parameters 2208 based on an overlap between the end effector 140 and the object (e.g. first object 2230 or second object 2232), information regarding physical aspects of the object, and/or records from previous transfers of the same type of object. For example, the robotic system 100 can identify the overlapped area and the corresponding vacuum regions 1001-1, 1001-2, 1001-3 and/or suction elements 1004. Further, the robotic system 100 can derive the movement control parameters 2208 using a predetermined function that takes as input a size or amount of the overlapped area and/or the number of suction elements 1004 over the object. For example, the robotic system 100 can determine which of the vacuum regions (e.g., regions 1001-1-1001-3 of FIG. 10A or regions 1101-1 and 1101-2 of FIG. 11A) are to be activated for the grasp models. The predetermined function may further use a weight, a CoM information, one or more dimensions, a surface type, and/or other information in the master data regarding the object. In some embodiments, the robotic system 100 can automatically adjust the movement control parameters 2208 (e.g., the TSM) based on occurrences (e.g., for decreasing the parameters) or prolonged absence (e.g., for increasing the parameters) of initial grip failures and/or package loss during transfer.

The robotic system 100 can process the movement control parameters 2208 according to the placement of the side pad 141-1. For example, the robotic system 100 can derive the movement parameters 2208 based on a distance and/or a torque-based relationship between the grip location of the side pad 141-1 and the CoM or a center portion of the object. In some embodiments, the robotic system 100 can increase the TSM when the vertical position of the grip location for the side pad 141-1 is closer to the CoM or the center portion, which corresponds to higher grip stability. In other embodiments, the robotic system 100 can derive higher TSM values for grip locations of the side pad 141-1 that are below the CoM than grip locations of the side pad 141-1 that are above the CoM.

As an illustrated example, the first TSM 2218 may be greater than the second TSM 2228 since the first grasp model 2202 covers a greater amount of the top surface of the first object 2230 in comparison to the second grasp model 2204. In other words, the first TSM 2218 can be 'X' and the second TSM 2228 can be 'Y', where 'X>Y.

In some embodiments, for the grasp set that is derived offline, the robotic system 100 can analyze the image data to select a grasp set applicable for grasping the target package 112 with the end effector 140. The robotic system 100 can use one or more parameters described above, such as the openness of corners/edges, threshold distances, or the like, to qualify and/or select the grip pose. In some embodiments, the robotic system 100 can further use the TSM and/or other parameters to select the grip pose that produces the lowest transfer time, the lowest estimated failure rate, or a combination that balances two or more factors.

End Effectors

Figure 13:
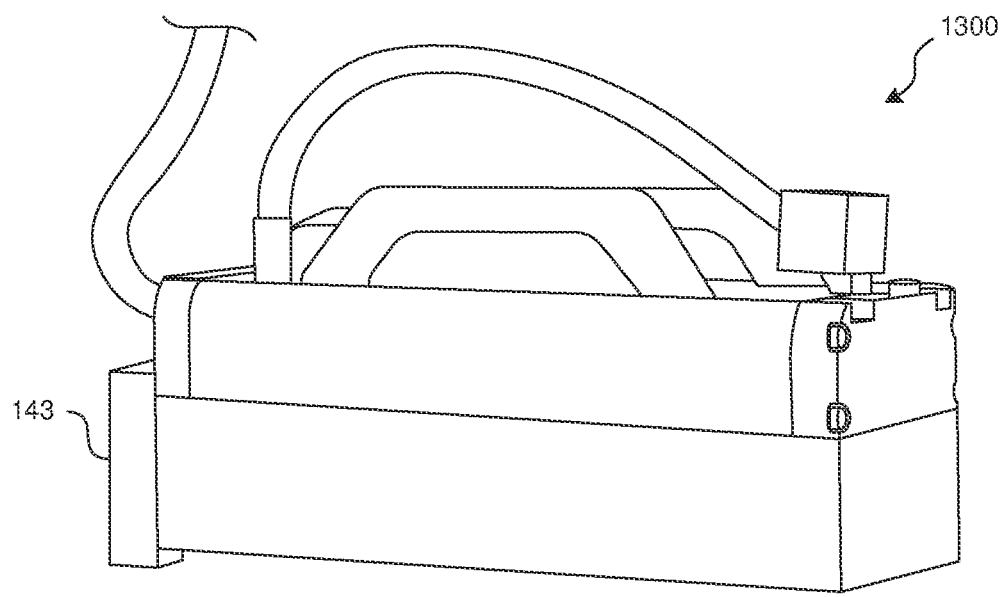
FIG. 13 is an isometric view of a multi-gripper assembly in accordance with another embodiment of the present technology.
Figure 14:
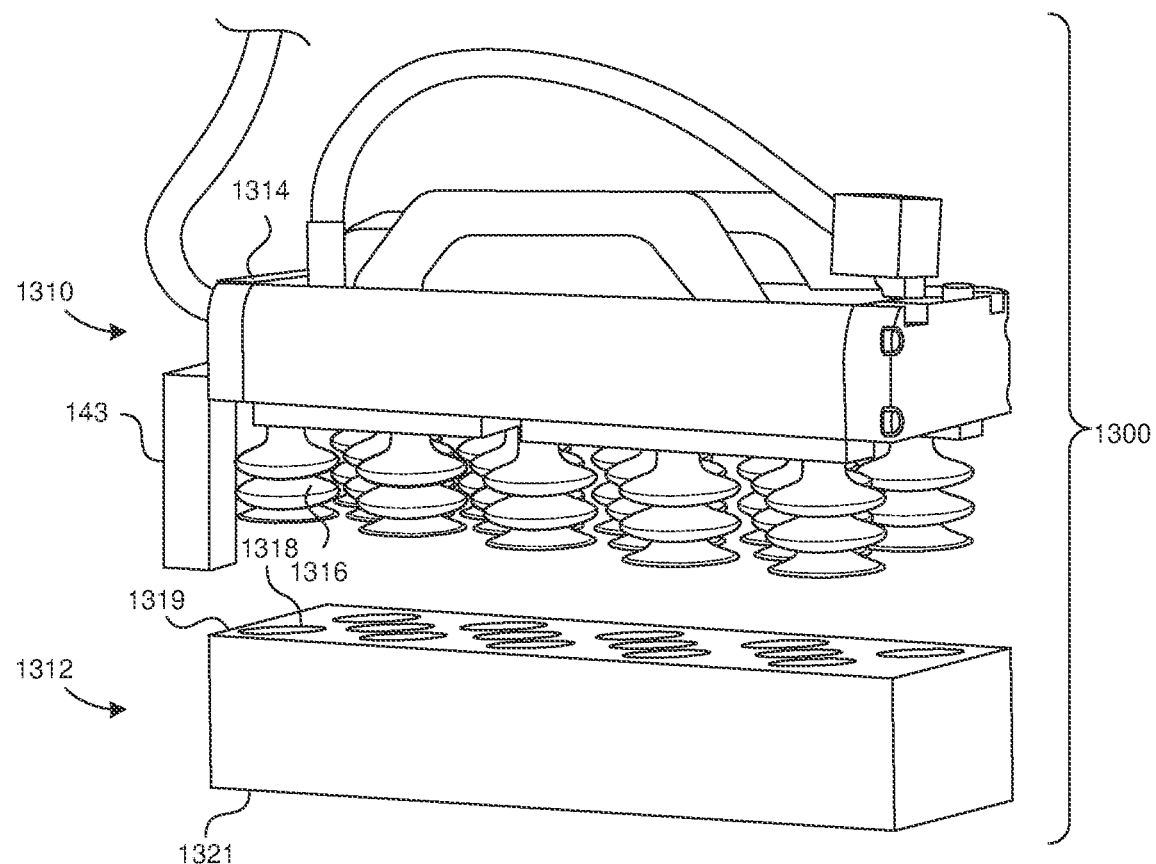
FIG. 14 is an exploded isometric view of the multi-gripper assembly of FIG. 13.

FIG. 13 shows a gripping apparatus 1300 suitable for use with robotic systems (e.g., robotic system 100 of FIGS. 1-2) in accordance with some embodiments of the present technology. The gripping apparatus 1300 can correspond to a portion of the multi-surface gripper assembly 141 described above with respect to FIG. 3. The gripping apparatus 1300 may, for example, correspond the side pad 141-1 and the top pad 141-2 shown in FIG. 3. FIG. 14 is an exploded view of the gripping apparatus 1300 of FIG. 13. The gripping apparatus 1300 can be any gripper or gripper assembly configured to grip a package from a stationary position (e.g., a stationary position on a de-palletizing platform such as a platform 110 of FIG. 3). The gripping apparatus 1300 can include a gripper mechanism 1310 and a contact or sealing member 1312 ("sealing member 1312"). The gripper mechanism 1310 includes a main body 1314 and a plurality of suction elements 1316 (one identified in FIG. 14) each configured to pass through an opening 1318 (one identified in FIG. 14) of the member 1312. When assembled, each of the suction elements 1316 can extend through, either partially or completely, a corresponding opening 1318. For example, the suction elements 1316 can extend through a first side 1319 toward the second side 1321 of the sealing member 1312.

Operation Planning for Multi-Surface Gripper Assembly

Figure 15:
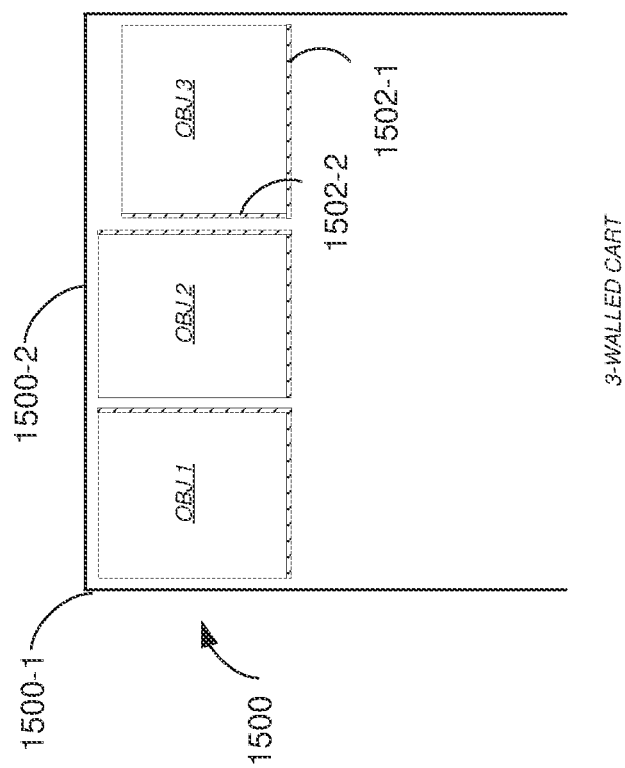
FIG. 15 illustrates an example placement plan in accordance with one or more embodiments of the present technology.

FIG. 15 illustrates an example placement plan in accordance with one or more embodiments of the present technology. The placement plan can be based on a targeted container (e.g., target container 1500 corresponding to a three-walled cart), such as based on a type, a size, a physical trait, a real-time condition, or the like for the targeted container. The placement plan can be derived based on the existence and/or locations of walls of target container 1500 that may collide with the side pad 704 during lowering and/or placing of the objects in the targeted container. The robotic system can derive the placement plan based on identifying and deriving locations of the side pad 704 and/or corresponding (e.g., contacting) peripheral surfaces (shown using patterned edges in FIG. 15) of target objects (e.g., object 1, 2, and/or 3) away from obstacles, such as walls of target container 1500 or previously placed/existing objects. Also, the robotic system can derive the placement plan according to the processing sequence, which can be used to track or estimate the real-time conditions (e.g., object locations, surface heights, actual shape/location of container walls, etc.) of the targeted container.

For the example illustrated in FIG. 15, the robotic system can derive the placement plan for target container 1500 corresponding to the three-walled cart. The processing sequence can identify the transfer of object 1 first, followed by object 2, and then by object 3. The robotic system can derive the placement plan based on a predetermined process, ruleset, template, or the like for orienting a specified side surface (e.g., the side surface designated to be contacted or supported by the side pad 704) away from the sidewalls and existing objects. In FIG. 15, the side surfaces designated to be contacted by the side pad 704 are illustrated with a pattern. For example, object 1 has a bottom surface and a right-hand side surface designated as surfaces that can be contacted by the side pad 704, and object 3 has a bottom surface and a left-hand side surface designated as surfaces that can be contacted by the side pad 704. Moreover, the placement location for each object can be derived to be closer to corners, walls, previously placed objects, and/or other placement rules or preferences. Accordingly, object 1 can be placed against an inside corner 1500-1 of the target container 1500 with the specified side surfaces (illustrated with the pattern) placed away and/or opposite the walls that form the corresponding inside corner. The robotic system can derive the placement location of object 2 against the inside wall (e.g., wall 1500-2) and adjacent to object 1. The specified surfaces (illustrated with the pattern) of object 2 can be oriented opposite or away from the inside wall and/or object 1.

When the remaining space in the target container 1500 is sufficient for only one object, the robotic system can apply a corresponding set of rules, processes, etc. For example, the robotic system can derive the placement pose for the corresponding object (e.g., object 3) based on orienting the specified surface 1502 opposite the inside wall 1500-2, outside the remaining space, and/or away from the previously placed objects. Also, the robotic system can derive the placement pose based on releasing and/or retracting the side pad 704 (e.g., from surface 1502-2) before lowering and/or placing the object in the remaining space. For example, object 3 is transferred from the start location to the drop location at the target container 1500 by using the top pad 702 and the side pad 704. The side pad 704 may be in contact with surface 1502-2 of object 3 while the top pad 702 is in contact with the top surface of object 3. However, since the remaining space in the target container 1500 is limited, in accordance with the placement plan derived by the robotic system, the side pad 704 is released and/or retracted from the surface 1502-2 prior to lowering object 3 into the target container 1500. In this way, the side pad 704 will not be obstructed by surfaces of object 2. Alternatively, the side pad 704 may be in contact with surface 1502-1 of object 3 while the top pad 702 is in contact with the top surface of object 3. In such instances, in accordance with the placement plan derived by the robotic system, the side pad 704 is not released or retracted from the surface 1502-1 prior to lowering object 3 into the target container 1500. The placement plan will optimize the location of the side pad 704 on a target object based on an estimated time required for transferring the objects from the start location to the drop location. The optimization of the time for transferring the objects is described further with respect to FIGS. 17B and 17C.

In some embodiments, the robotic system can derive the placement locations based on comparing the real-time and/or estimated surface heights within the container to the side pad 704 location for the corresponding targets. For example, when the side pads are located above a bottom portion/edge of the transferred object, the robotic system can calculate a height of the bottom portion of the pad when the transferred object is placed at a candidate location and compare the calculated height to surface heights. The robotic system can validate the placement location when the calculated height is above the surface heights.

Object Manipulation Using Multi-Surface Gripper Assembly

Figure 16:
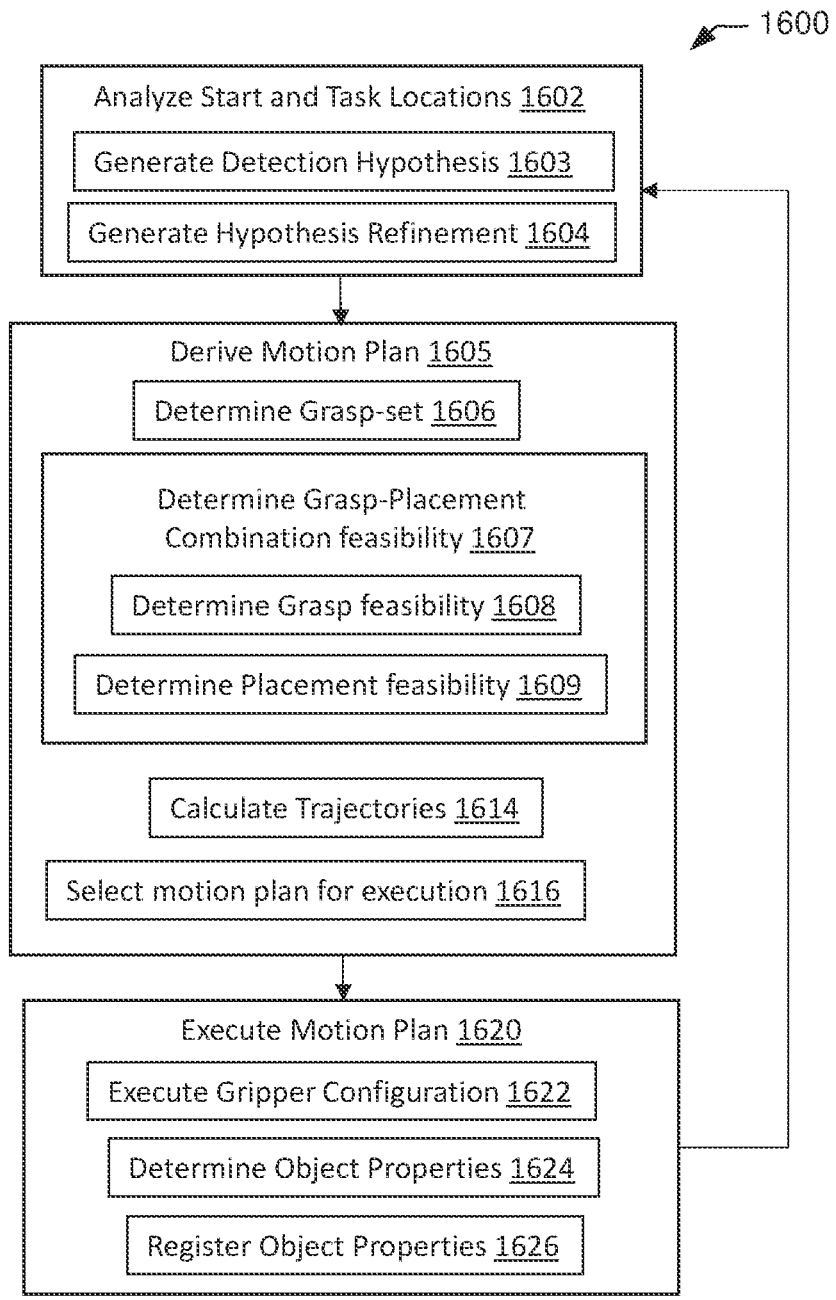
FIG. 16 illustrates a flow diagram for operating a robotic system in accordance with one or more embodiments of the present technology.

FIG. 16 illustrates a flow diagram for operating a robotic system in accordance with one or more embodiments of the present technology. The flow diagram can correspond to a method 1600 of operating the robotic system (e.g., the robotic system 100 described with respect to FIG. 1) and/or the multi-surface gripper (e.g., multi-surface gripper assembly 700 described with respect to FIGS. 7A-9F). The method can include deriving the processing sequence, the placement plan/location, and/or the corresponding motion plans. The method can further include implementing (via, e.g., communicating the motion plans or corresponding information to the robotic unit) and/or executing (at, e.g., the robotic unit) the motion plans to transfer the objects.

At block 1602, the robotic system can analyze sensor information corresponding to the start location (also referred to as a source location) and/or the task location (also referred to as a destination location). For example, the robotic system can obtain the sensor information depicting the start location and/or the task location. The sensor information can include the imaging sensor information, such as 3D point cloud information and/or 2D information. In some embodiments, obtaining the sensor information can include capturing an image of the start location and/or the task location with imaging system 160 described with respect to FIG. 1). In some embodiments, obtaining the sensor information can include receiving image data to identifying target packages or objects based on the image data, as described with respect to FIGS. 4A and 4B. Also, the robotic system can identify a set or type of containers (e.g., pallets, cages, carts, boxes, etc.) corresponding to the task location for receiving the objects. In some embodiments, the robotic system can access models or templates for the identified containers corresponding to the task location for subsequent processing and analysis. The robotic system may also analyze the sensor information (e.g., 2D image and/or 3D depth map) to determine one or more real-time conditions (e.g., surface heights, object/obstacle locations, shapes, types, or the like) associated with the start location and/or the task location. For example, in FIG. 15, the task location can be the target container 1500 corresponds to a three-walled cage. In some embodiments, the start location and the task location are depicted from different sets of image sensor information. This may be, e.g., because the start location and the task location are separated from each other with a distance that is not imageable by a single image. For example, a first set of one or more images can depict the start location, and a second set of one or more images can depict the task location. Alternatively, the start location and the task location can be depicted from a single set of one or more images.

At block 1603, the robotic system can generate a detection hypothesis corresponding to one or more objects (e.g., objects in FIGS. 4A and 4B) in the source location. The robotic system can generate the detection hypotheses to identify the one or more objects based on analyzing the imaging sensor information to detect objects, such as by identifying a type or an identifier of the object and/or a real-world location of the object depicted in the imaging sensor information. In some embodiments, the robotic system can identify the objects based on detecting corners and/or edges, identifying surfaces, comparing surface dimensions to the master data, comparing visual images of surface or a portion thereof to the master data, or the like. Objects that have corresponding entries in the master data are referred to as registered objects. Objects that do not have corresponding entries in the master data are referred to as unregistered objects. The robotic system can access characteristic data for the registered objects. The robotic system can access additional descriptions attributed to the registered objects, such as by accessing other descriptions such as dimensions, weight, CoM location, or the like. For registered objects, the detection hypotheses can include the identity, the additional descriptions, orientation, and/or relative position of the registered object that has been detected by the robotic system 100.

In some embodiments, as part of generating the detection hypothesis, the robotic system 100 can identify exposed outer corners of the object stack (e.g., object stack 404 in FIGS. 4A and 4B) as represented in the image data (e.g., the point cloud data). For example, the robotic system 100 can identify the exposed outer corners (e.g., corners C1, C2, and C3 in FIG. 4A) based on detecting intersections/junctions between two or more of the exposed edges (e.g., edges identified in 3D image data, also referred to as 3D edges) having different orientations (e.g., extending at different angles). In one or more embodiments, the robotic system 100 can identify the exposed outer corners when the exposed edges form an angle that is within a predetermined range (also referred to as an angle range), such as for a threshold angle range greater than and/or less than 90 degrees.

As an illustrative example, the robotic system 100 can identify the open corner C3 by identifying the depth zone Z1 and adjacent depth zones Z2 and Z3 of FIG. 4A. The robotic system 100 can identify the depth zone Z1 when a set of adjacent horizontal locations in the scanned region layer has depth values that are within the threshold continuity range, which represent point cloud data that correspond to an object surface, from each other. The robotic system 100 can identify the adjacent depth zones Z2 and Z3 as other horizontal locations having depth values that are outside of the threshold continuity range from depth values in the depth zone Z1.

In some embodiments, the robotic system 100 can identify edges of the depth zone Z1 and/or start of the adjacent depth zones Z2 and Z3 when depth values change to fall outside of the threshold continuity range and/or when the locations of the depth value changes match a shape template (e.g., a straight line and/or a minimum separation width between objects). More specifically, the adjacent depth zones Z2 and Z3 can have the depth values that represent distances that are further from an imaging sensor than the depth values for the surface of the object stack 404 (e.g., the depth zone Z1). The resulting edges between the depth zone Z1 and the adjacent depth zones Z2 and Z3 can correspond to the exposed edges. In some embodiments, identifying the open 3D corner, such as the corner C3, may include verifying that the depth zone Z1 forms a quadrant, while the adjacent regions 616a-c correspond to remaining quadrants and/or empty spaces, such as for locations outside of the object stack.

In some embodiments, the robotic system 100 can process a three-dimensional (3D) point cloud to identify the exposed outer corners of the objects in the object stack (e.g., one of the exposed outer corners of FIG. 4A). For example, the 3D point cloud can correspond to a top view of the object stack 404 generated by a 3-dimensional camera. The point cloud may include a 3-dimensional point cloud with multiple layers indicative of depth. Each layer and/or a surface may correspond to a set of horizontally adjacent depth values that are within a threshold continuity range from each other. For example, the threshold continuity range can require horizontally adjacent locations to have depth measures that are within a threshold distance (e.g., less than 1 centimeter) from each other or within a threshold distance according to a slope. A depth of a layer of the point cloud may correspond to a separation along a direction normal to a surface of a corresponding object (e.g., vertical separation).

Accordingly, the robotic system can analyze and process the point cloud to segment the layers and/or to identify open 3D edges/corners. In some embodiments, the robotic system 100 (e.g., one or more processors therein) can identify layers based on grouping depth values in the point cloud according to one or more predetermined continuity rules/threshold. For example, the robotic system 100 can group a set of horizontally adjacent/connected depth values when the depth values are within the threshold continuity range of each other and/or when the depth values follow a constant slope representative of a flat and continuous surface. The robotic system 100 can identify exposed edges (e.g., exposed edges in FIGS. 4A and 4B) as boundaries of the identified layers. In other words, the robotic system 100 can identify the exposed edges as horizontal peripheral locations of the layer/surface where a qualifying depth change occurs. In general, the depth measures for objects/edges forming a top layer of the object stack 404 may have a lower magnitude than objects/edges forming a lower layer below the top layer.

In some embodiments, the robotic system 100 can generate the detection hypothesis based on the point cloud segmentation. For example, the robotic system 100 can analyze the surfaces in the top layer of the point cloud segmentation and compare extracted features from the 2D image, such as the texture, pattern, or other visual features, corresponding to the surfaces to the textures, patterns, and/or visual features of registered objects in the master data. Also, the robotic system 100 can compare the shape and/or dimensions of the surfaces to the master data. The robotic system 100 can generate the detection hypothesis for the objects based on matching one or more characteristics of the top layer surface(s) to corresponding registered object(s) in the master data. In some embodiments, the robotic system 100 can generate the detection hypothesis as the MVR, as described above, when the point cloud segmentation and/or extracted features do no match registered objects in the master data. In other embodiments, information that the objects in the object stack are not included in the master data and the robotic system 100 can generate the detection hypothesis as the MVR.

In some embodiments, the robotic system 100 can generate the detection hypothesis to include information about the degree of openness for the open edges and the open corners. For example, during the detection process, the robotic system 100 can calculate the horizontal plane openness based on the open edges of the detection hypothesis and the horizontal openness distance, such as horizontal openness distance D1 of FIG. 4A, and/or the vertical plane openness based on the open edges of the detection hypothesis and vertical openness distance, such as the vertical openness distance D5 of FIG. 4B.

At block 1604, the robotic system 100 can generate a hypothesis refinement for the detection hypothesis based on the refinement unit. In some embodiments, the robotic system 100 can generate the refinement unit based on one or more of the open corner units. For example, the robotic system 100 can generate the refinement unit by linking each of the open corner units used to generate the detection hypothesis for an object. As described above, the robotic system 100 can generate the hypothesis refinement by applying various algorithms according to the refinement units. For example, the robotic system 100 can refine the pose, orientation, size, and/or position of the detection hypothesis using iterative closest point refinement (ICP), which seeks to minimize the difference between two clouds of points, or singular value deposition (SVD) on the refinement unit and the detection hypothesis to generate the hypothesis refinement.

At block 1605, the robotic system can derive a motion plan for the transfer of one or more of the objects from the start location to the task location. In general, the motion plan can include on or more trajectories and/or operations based on the one or more detection hypotheses. For example, the motion plan can include a grasp model for gripping the object, trajectories for the robot arm, and operations for grasping and releasing the object. Derivation of the trajectories and operations of the motion plan will be discussed below.

In some embodiments, the robotic system 100 can determine the grasp set for the detection hypothesis in block 1606. For example, the robotic system 100 can determine the object grasp set for the detection hypothesis corresponding to the target object. In general, the object grasp set for the detection hypothesis can be determined based on matching the object properties (e.g., such as object dimensions, object mass, and/or center of mass) of the object corresponding with the detection hypothesis to object properties of the object grasp set. As described above, the object grasp set is information describing a set of different grasp configurations for an object-gripper pair. For example, the object grasp set can one or more of the object grasp models that correspond to gripping configurations corresponding to a single object. In general, for palletizing and depalletizing operations that primarily utilize suction based grippers, each of the grasping models the detection hypothesis generated in block 1604 (e.g., a considered/analyzed package) of a given dimension can include a placement, position, and/or orientation of the gripping surface(s) of the gripper relative to the surface of the object; a corresponding measure of grasp strength or grasp stability for the grip model; the suction elements that are engaged for the grasp in the case of grippers capable of independent or separate suction control (i.e. independently controllable suction cups or multi-bank suction pads), or a combination thereof. As described above, the object grasp models can further include parameters associated with the end effector that includes the top pad and the side pad, in accordance with the determined object grasp sets. The parameters may include, for example, orientation parameters associated with the movement of the robotic arm system 132 and end effector 140 of FIG. 3, such as robot joint values. In some embodiments, the object grasp sets can be generated prior to deriving the motion plans (via, e.g., a pre-programmed or offline derivation) to reduce overall processing times. In other embodiments, the object grasp set can be generated in real-time, such as for a detection hypothesis that includes an MVR. The robotic system 100 can select or generate the object grasp set or multiple object grasp sets that correspond to dimensions of the detection hypothesis, with the minimum viable region of the detection result, and/or openness of the object. At block 1607 the robotic system 100 can determine the target objects from the one or more detection hypotheses based on a grasp-placement combination feasibility for the object grasp set. In general, the grasp-placement combination feasibility determines whether a grasp set for the end effector and the detection hypothesis includes one or more grasp models capable of at least grasping, transfer, and placement of the object corresponding with the detection hypothesis. The robotic system 100 can forego further generation of the motion plan for the detection hypothesis when the grasp-placement combination feasibility does not exist. In some embodiments, the grasp-placement combination feasibility can be determined based on a grasp feasibility of the objects and a placement feasibility of the objects, or a combination thereof.

The grasp feasibility describes whether it is possible for the robot to access the object at the start location, grip the object, and remove the object from the start location without collisions or unintentionally disturbing adjacent objects (i.e., collisions with other objects in the environment or unintentionally gripping adjacent objects). The placement feasibility describes whether it is possible for the robot to approach the placement location with the object gripped, place the object at the placement location, and depart from the placement location after placing the object. In general, the robotic system 100 can determine the grasp feasibility and the placement feasibility based on factors such as accessibility of the object (e.g. will the grasp model overlap with adjacent objects), potential obstacles, and collisions (e.g. will the gripper and/or the object collide with objects when approaching and/or departing during the grasp operation and/or the release operation), robot limitations (e.g. do a combination of robot joint values exists for the robot to achieve the pose/orientation of the grasp model). In some embodiments, the robotic system 100 can determine the grasp feasibility and the placement feasibility in parallel. In other embodiments, the robotic system can determine the grasp feasibility and the placement feasibility in series, where placement feasibility is determined based on the determination of the grasp feasibility.

In some embodiments, the robotic system 100 can determine the grasp feasibility at block 1608 for one of the grasp models is non-feasible when the open edge or open corner of the target object does not have a sufficient degree of openness to allow the end effector to contact the target object which can, for example, be based on one or more of the threshold distances D2, D3, and D4 described with respect to FIGS. 4A and 4B. The threshold distances D2, D3, and D4 can be used to determine whether there is sufficient clearance space for the multi-surface gripper to approach, sufficient surface area to make contact with, and grasp the object. For example, as shown in FIG. 4A, the degree of openness of the corner C5 is limited because of its proximity to the corner C6 of the object D. The corners C5 and C6 may thereby be too close to each other for the multi-surface gripper assembly (e.g., the multi-surface gripper assembly 141 in FIG. 3) to get in contact with the surface of the object C near the corner C5. Thereby, the grasp model for a grasp location at the corner C5 of the object D would be identified as non-feasible and thereby be determined as non-feasible while a grasp model with a grasp location around the corner C3 of the object D in FIG. 4A would be feasible.

At block 1609, the robotic system 100 can determine the placement feasibility for the detection hypothesis. In general, the robotic system 100 can effectively perform an analysis similar to determining grasp feasibility when determining the placement feasibility for placement of the object corresponding to the detection hypothesis at the task location. In other words, the robotic system 100 can determine whether or how the target package may be placed at the task location without colliding with existing obstacles (e.g., container walls, previously placed objects, or the like). In some embodiments, the robotic system 100 can analyze the sensor data corresponding to the task location to identify the placement location of the detection hypothesis and corresponding clearance measurements. For example, the robotic system 100 can effectively analyze a model of the target package at the placement location and the corresponding location of the end effector that corresponds to the grasp model. In some embodiments, the robotic system can consider different poses (e.g., 180° rotated) for the grasp model.

Returning to block 1607, the robotic system 100 can determine the grasp-placement combination feasibility. In some embodiments, the robotic system 100 can determine whether the grasp-placement combination feasibility exists for the end effector-object pair by identifying the grasp model that satisfies both the grasp feasibility and the placement feasibility. In some embodiments, the robotic system 100 can determine the grasp-placement combination feasibility by determining whether a preliminary trajectory can be calculated between the start location of the object and the task location using the grasp model. Since calculation of a complete trajectory is computationally resource intensive, the robotic system 100 can implement a heuristic method to quickly determine whether a trajectory can be calculated for robot motion. For example, the robotic system 100 can calculate the preliminary trajectory to determine if any inverse kinematic solution (e.g., joint values) exists to link the grasp model at the start location with that of the task location. If the robotic system 100 determines that the preliminary trajectory cannot be calculated, the robotic system can eliminate any grasp models for that grasp-placement pair. The robotic system can determine the remaining set as the grasp models that provide both the grasping feasibility and the placement feasibility. When more than one grasp models are determined to be feasible, the robotic system can rank the feasible models according to the corresponding movement control parameters 2208 (e.g., TSM).

At block 1614, the robotic system 100 can calculate trajectories for the motion plans. More specifically, the robotic system 100 can calculate trajectories for the detection hypothesis corresponding to objects for which the grasp-placement combination feasibility exists. Each of the trajectories can be calculated to avoid collisions and can include a trajectory path, robot joint values corresponding to points along the trajectory path, acceleration, and/or velocities for points along the trajectory. As an example, the robotic system 100 can calculate the trajectories based on inverse kinematic algorithms. The trajectories for the motion plan can include a source approach trajectory, the grasp approach trajectory, the grasp depart trajectory, an object transfer trajectory, the destination approach trajectory, the destination depart trajectory, or a combination thereof. The source approach trajectory can be the trajectory calculated between an initial position, such as the last position of the robot arm after placement of a previous object or default position for the robot arm, to a position above the target object (e.g., the object to be grasped). The grasp approach trajectory can be a trajectory calculated to approach and grasp the object. The grasp depart trajectory can be a trajectory calculated to depart from the grasp position once the object has been grasped. The object transfer trajectory can be a trajectory calculated to transfer the object from above the grasp location to above the placement location at the task location. The destination approach trajectory can be a trajectory calculated to approach the placement location and release the object. The grasp depart trajectory can be a trajectory calculated to depart from the placement location once the object has been grasped. In some embodiments, the grasp approach, the grasp depart, the destination approach, and the destination depart can be calculated as linear trajectories.

In some embodiments, the robotic system 100 can calculate the object transfer trajectory based on feasible rotational maneuvers for orienting the side pad and/or the top pad according to the direction of movement. For example, the robotic system 100 can include trajectories for rotating the object so that the side interface (e.g., the side interface 704-1 of FIG. 7) of the side pad faces the horizontal direction of subsequent movement. In some embodiments, the robotic system 100 can calculate the trajectories for the rotational maneuver before or in conjunction with linear movements that exceed a threshold condition (e.g., over a predetermined location, having a minimum length, or the like). In some embodiments, the operation of the robotic system 100 may optionally include costs and benefits analysis associated with the use of the side pad. For the cost, the robotic system can calculate a side pad positioning duration estimate (also referred to as duration estimate or duration estimates) for positioning the side pad (e.g., according to a preceding position or setting) and/or grip the object with the side pad. The side pad positioning duration estimate can correspond to a period including the side pad starting from a retracted state and/or a previously planned location of the side pad, moving the side pad out laterally, lowering/raising the side pad to the position, laterally moving the side pad toward the target object surface, and/or engaging the grip forces against the contacted surface. In some embodiments, the corresponding duration estimates may be predetermined for one or more of such actions or maneuvers. For the benefit analysis, the robotic system can compare the baseline transfer duration without engaging the side pad and/or without the rotational adjustments to the reduced transfer duration for the side-pad-assisted motion plan. The robotic system can compare the cost and the benefit (e.g., the time saving) to determine the overall cost/benefit of deploying and using the side pad. In some embodiments, the robotic system can perform the cost/benefit analysis for a group of objects.

In some embodiments, the robotic system 100 can calculate the source approach trajectory to include a computation of gripper configuration parameter for a gripper configuration operation for the multi-surface gripper assembly. The gripper configuration operation for the multi-surface gripper assembly is the process of configuring the position of the side pad (e.g., the side pad 141-1 and/or the side pad 704) to that of the grasping model corresponding with the grasp-placement combination feasibility. The gripper configuration parameter defines the timing of when the gripper configuration operation is performed during the source approach trajectory. In general, gripper configuration operation can occur during three periods during the source approach trajectory: a pre-execution period, robot motion period, and a post-execution period. The pre-execution period occurs immediately prior to motion of the robot arm along the source approach trajectory such that the robot arm will begin execution of the trajectory as soon as the gripper configuration operation is complete. The robot motion period occurs during motion of the robot arm along the source approach trajectory such that the gripper configuration operation will commence during motion of robot arm, although it is not necessary for the gripper configuration operation to be completed before the robot arm completes execution of the source approach trajectory. The post-execution period occurs after the robot arm completes the execution of the source approach trajectory the gripper configuration parameter such that the gripper configuration operation will commence once the robot arm has stopped motion (e.g., the robotic system 100 will generate instructions to wait until the gripper configuration operation is complete before executing the next trajectory).

In some embodiments, the robotic system 100 can compute the gripper configuration parameter for the gripper configuration operation based on sensor information. For example, since the multi-surface gripper will be changing shapes during the gripper configuration operation, the robotic system 100 can analyze the sensor information corresponding to the environment along the trajectory path to identify potential collisions with objects in the environment. In general, the gripper configuration parameter corresponding to the robot motion period is most optimal in reducing the delay in execution of the motion plan due to the gripper configuration operation. Based on the analysis of the sensor information, the robotic system 100 can compute the gripper configuration parameter to commence the gripper configuration operation at any point along the trajectory path that will avoid collisions. For example, the gripper configuration parameter can be set to a point along the trajectory path after the multi-surface gripper assembly has departed from the three-walled cart to avoid potential collisions with the cart. In some embodiments, the robotic system 100 can set a default for the gripper configuration parameter as the post-execution period, such as when the gripper configuration operation during the robot motion period could result in a collision.

In some embodiments, the robotic system 100 can derive the placement location for placing the targeted objects at the task location. For example, the robotic system 100 can use a predetermined set of processes, models, and/or rules to derive the placement location. The placement location may be thereby based on positions and orientations of objects already positioned at the task location and distances between the objects. Furthermore, the placement location may be based on the shape and size of the task location. For example, the task location can be a cage cart (e.g., the cage cart 120 described with respect to FIG. 3) or a conveyer belt.

At block 1616, the robotic system 100 can select a motion plan for execution. In some embodiments, the robotic system 100 can select the motion plan based on an execution priority. In an example, the execution priority can be based on grasp stability where the robotic system 100 can select the motion plan for an object with a higher grasp stability over those with a lower grasp stability. In another example, the execution priority can be based on a path length of the trajectory path for the object transfer trajectory where the robotic system 100 can select the motion plan for an object with a shorter path length between the source location and the task location than those with a longer path length. In some embodiments, the robotic system 100 can select the motion plan based on a calculation time limit. The calculation time limit can be a maximum period of time in which the robotic system 100 is allowed to perform motion planning calculations/computations. As an example, the calculation time limit can be on the order of seconds, such as 1 to 1.5 seconds. When the calculation time limit is reached, the robotic system 100 can select the motion plan having the highest execution priority. In some cases, if no motions plan is completed before the calculation time limit is reached and the robotic system 100 can select and execute the first motion plan that is completed.

At block 1620, the robotic system can implement the motion plan(s). The robotic system can implement the motion plans based on communicating the motion plans and/or the corresponding commands/settings to the robotic unit. Accordingly, the robotic unit can execute the motion plan and transfer the targeted object.

In some embodiments, the robotic system 100 can compute the gripper configuration parameters for and execute the gripper configuration operation during the execution of the approach trajectory instead of during the calculation of the approach trajectory at block 1622. For example, the computation of the gripper configuration parameters can be performed as a background process and then subsequently executed during the execution of the source approach trajectory. Computation of the gripper configuration parameters can be performed similarly as described above.

In some embodiments, as illustrated at block 1624, the robotic system can determine physical object properties, such as object height, object mass, and/or object center of mass, of unrecognized or unregistered objects associated with the MVR or verify the physical properties of objects of the detection hypothesis that correspond to one of the registered objects. As an example of mass and/or center of mass determination, the robotic system 100 can use measurements from force-torque sensors on the end effector 140 (e.g. the multi-surface gripping assembly) to calculate the object mass and/or center of mass of the object while the end effector 140 is grabbing the object.

As an example of height determination, the robotic system 100 can obtain and analyze sensor information such as 3D image data, of the location of the target object at the source location prior to transfer/removal of the target object and after transfer/removal of the target object, to determine the height of the target object. More specifically, the robotic system 100 can determine the height of the target object by comparing: 1) the depth information from the 3D image data corresponding to portions of the top surface of the target object when the object is at the start location (also referred to as the object top surface depth); and 2) the depth information of the surface on which the target object was stacked above (i.e. the top surface of the object that was below the target object) after the target object is removed from the source location (also referred to as the object support surface depth). In other words, the robotic system can determine the height of the target object as the difference between the object top surface depth and the object support surface depth. In another example, the robotic system can calculate the height of the object based on sensor information corresponding to the position of the end effector during a crossing event that corresponds to a bottom portion of the object entering or leaving a known height (e.g., as observed by a line sensor). The robotic system can register the transferred object and/or the dynamically determined height thereof into the master data for subsequent processing of matching objects.

In some embodiments, the robotic system 100 can determine the height of the object based on a set of destination sensors configured to monitor the placement of the object at the task location. For example, the destination sensors can include line sensors (e.g., optical sensors) that transmit optical signals and/or detect changes in the optical signals caused by transferred packages and/or robotic units (e.g., the end effector 140). Some example line sensors can detect absence of corresponding laser or optical signals to indicate crossing or entry events and subsequent detections of the laser/optical signals to indicate exit events.

The robotic system 100 can use the destination sensors to determine or verify other physical aspects of the transferred packages. For example, the robotic system 100 can use the crossing event to determine heights of the packages. The detection lines/planes of the destination sensors can be at known heights. Accordingly, the robotic system 100 can determine the package heights by identifying the height of the end effector 140 at the time of a crossing event and calculating a difference between the identified height and the known heights of the destination sensors. Also, the robotic system 100 can identify the triggered instances of the linearly arranged sensors to determine a corresponding lateral dimension of the transferred package.

In some embodiments, the robotic system 100 can automatically register the transferred object into the master data using the obtained information (e.g., estimated dimensions, visual image data, height data, weight, mass, center of mass, or the like) at block 1626. The newly created object registration can be used to transfer subsequent objects that match the initially obtained information and also to adjust the side pad locations (e.g., non-default locations) for the subsequent transfers.

In some embodiments the robotic system 100 can identify and process a subsequent object in the object stack 165 using previously obtained images and/or the processes described above. for example, the robotic system 100 can generate additional detection hypotheses and process the detection hypotheses based on a new set of data (e.g., image data) for the start location and/or the task location and repeat the above-described process as represented by the feedback loop to block 1602.

Example Implementation Details

Figure 17A:
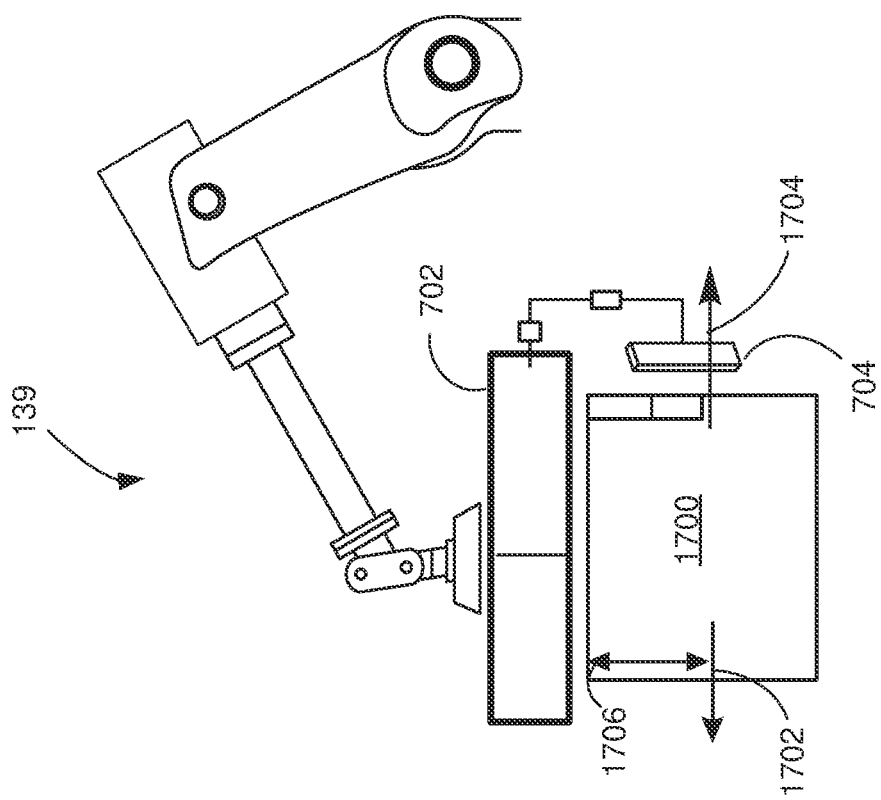

FIG. 17A-17C illustrate details of example embodiments of the operation of a robotic system in accordance with one or more embodiments of the present technology. As described above, the side pad is configured to provide additional support and/or grip for transferring the target object. The side pad can be different from other grippers that pinch objects by compressing opposing sides. The side pad (e.g., the side pad 704 in FIG. 17A) can provide support against inertia experienced by the target object when moving or accelerating along a direction opposite the inertial force. For the example illustrated in FIG. 17A, a target object 1700 can experience inertia in the direction indicated by arrow 1702 when moving in the direction indicated by arrow 1704. Moreover, by reducing the inertial experienced by the target object 1700, the robotic system can reduce the torque (illustrated in FIG. 17A using a laterally oriented arrow within the top pad 702) experienced by the top pad 702. Accordingly, the robotic system can use the side pad 704 to reduce grip loss/failure at peripheral edges of the top pad 702 (e.g., peeling failure) due to the experienced torque.

As described above, the robotic system can determine the location of the side pad 704 according to one or more traits of the target object 1700. In some embodiments, the robotic system can determine the location such that the side pad at least partially overlaps or is at least partially below a CoM location 1706 of the target object 1700 or an estimate thereof.

The support against inertia provided by the side pad may be particularly needed in instances where target object 1700 has a weak top surface that is not capable to support transferring the object by suction merely by the top pad. In other words, the force applied by the top pad 702 onto the top surface (illustrated in FIG. 17A using upward-pointing arrows inside the top pad) can correspond to the weight of the target object 1700. The robotic system can use predetermined indicators to identify that the structural integrity of the top portion or packaging of the target object 1700 may be insufficient to withstand the applied force. In such case the robotic system can grasp the target object 1700 with the side pad 704 to provide additional support, thereby reducing the force applied by the top pad 702 to lift the target object 1700. Similarly, the robotic system can use the side pad 704 to increase the max grip weight (e.g., in comparison to using only the top pad 702) for the end effector.

The side pad can enable the robotic system to increase the force/acceleration used in transferring the object. In FIG. 17B, the solid curve illustrates an exemplary acceleration of a target object against time (t) required for transferring the target object from the start location to the drop location. The solid curve illustrates the acceleration over time when using only the top pad to grasp the target object and the dashed line illustrates the acceleration over time when using the top pad and the side pad. As shown, the time required for transferring the target object from the start location to the drop location is reduced (e.g., by $t_{gain}$) when using both the top pad and the side pad based on the increased support described above.

The robotic system can compare the benefit provided by the increased force/acceleration to the additional time ($t_{ad-ditional}$) associated with placing and/or engaging the side pad to determine an overall efficiency gain. FIG. 17C illustrates a manner of placing the side pad 704 in contact with the target object 1700. In Section I) of FIG. 17C, the side pad 704 is in a default retracted position. In Section II) of FIG. 17C, the multi-surface grip assembly has moved the side pad 704 to a position closer to the target object 1700 and in Section III) the multi-surface grip assembly has moved the side pad to be in contact with a side surface of the target object 1700 (e.g., at a determined side pad location on a side surface of the target object 1700). The time ($t_{additional}$) required for moving the side pad 704 from the retracted position to being in contact with the side surface of the target in accordance with FIG. 17C is compared with the time reduced ($t_{gain}$) by using the side pad in addition to using the top pad for moving the target object. Accordingly, the robotic system can compare the gained efficiency ($t_{gain}$) to the cost associated with placing and engaging the side pad.

Exemplary Embodiments

In accordance with some embodiments, a multi-surface gripper (e.g., multi-surface gripper assembly 700 in FIGS. 7A-9F) includes a first pad (e.g., the side pad 704) configured to grasp a first surface of a target object (e.g., the side surface) and a second pad (e.g., the top pad 702) configured to grasp a second surface of the target object (e.g., the top surface). The first pad includes a first plurality of suction elements (e.g., suction elements 1004 in FIG. 10A) and the second pad includes a second plurality of suction elements. The first pad and the second pad are operably coupled and positioned non-parallel with respect to each other (e.g., as shown in FIG. 7C) so that the first pad is configured to grasp a first surface of a target object and the second pad is configured to contact a second surface of the target object (e.g., as shown in FIG. 17C). The second surface of the target object is non-parallel to the first surface of the target object.

In some embodiments, the first pad and the second pad are positioned substantially orthogonal to each other such that the first plurality of suction elements defines a first grip interface and the second plurality of suction elements defines a second grip interface. The second grip interface is substantially orthogonal to the first grip interface. In some embodiments, an angle defined by the two pads is ranging from 90 degrees to 110 degrees. In some embodiments, the angle defined by the two pads is substantially 90 degrees (e.g., 90 degrees+/−2 degrees).

In some embodiments, the first grip interface is configured to grasp a vertical surface of the target object, and the second grip interface is configured to grasp a horizontal surface of the target object. In some embodiments, the target object has a cuboidal or cubic shape (e.g., target object 1700 is a cuboidal box).

In some embodiments, the second pad has a fixed position and/or orientation with respect to the first pad. For example, the top pad 702 and the side pad 704 are mechanically coupled to each other so that their relative positions are maintained. In some embodiments, the second pad is operably coupled with the first pad so that a position and/or an orientation of the second pad is changeable with respect to a position and/or an orientation of the first pad. For example, as shown in FIG. 7C, the side positioning mechanism 710 can include actuators for changing position and/or orientation of the side pad 704 (e.g., the first pad) with respect to the top pad 702 (e.g., the second pad). The actuator mechanism for vertical motion (as shown by the dashed arrows 714-2) and horizontal motion (as shown by the dashed arrows 714-1) can be the same or differ from one another. In some embodiments, the actuator for vertical motion can be a piston or cylinder-based actuator.

In some embodiments, the first plurality of suction elements includes a first zone of suction elements and a second zone of suction elements. For example, grip interface 1000 includes suction elements 1004 grouped into vacuum regions 1001-1, 1001-2, and 1001-3 in FIG. 10A. The second zone of suction elements is adjacent to the first zone. In some embodiments, the first zone of suction elements and the second zone of suction elements are independently activatable. For Example, FIG. 11B illustrates the multi-surface gripper assembly 700 positioned with zones 1 and 2 overlapping a targeted object (object 1). The robotic system can activate the overlapped zones (e.g., zones 1 and 2) to grip the targeted object. The robotic system can deactivate or not engage the non-overlapped zone and/or any zones that overlap non-targeted objects.

Exemplary Methods

An example method 1 of operating a robotic system comprises Generating a detection hypothesis corresponding to a target object based on sensor information depicting objects at a start location. The detection hypothesis for the target object is generated at least based on having an open edge for grasping the target object using a multi-surface gripper assembly. The multi-surface gripper assembly includes a first pad configured to grasp a first surface of the target object and a second pad configured to grasp a second surface of the target object. The method includes determining a horizontal plane openness and a vertical plane openness for the open edge. The horizontal plane openness and the vertical plane openness represent measures of open space. The method includes deriving a motion plan for the multi-surface gripper to transfer the target object from the start location to a placement location. Deriving the motion plan includes determining a grasp model defining a position for the first pad on the first surface of the target object and the second pad relative to the second surface of the target object based on the horizontal plane openness and the vertical plane openness. The method includes implementing the motion plan for transferring the target object from the start location to the placement location in accordance with the motion plan.

The example method 1, where identifying the open edge includes determining an exposed corner as a vertex between the open edge and an intersecting open edge. The method includes generating a hypothesis refinement for the detection hypothesis based on a position of the exposed corner and the two open edges extending from the exposed corner.

The example method 1, where deriving the motion plan includes calculating an approach trajectory including a trajectory for moving the multi-surface gripper assembly from a first position to a second position. The second position is above the target object, so that the multi-surface gripper assembly can initiate a grasp approach to contact a surface of the target object from the second position.

The example method 1, where determining the target grasp position for the first pad includes determining a default pad position at or about an open corner for the first pad when the target object does no correspond to a registered object.

The example method 1, where determining the target grasp position includes determining multiple grasp configurations for a combination of the multi-surface gripper and the target object. A respective grasp configuration of the multiple grasp configurations includes a position and an orientation of the first pad relative to the open edge of the target object. Determining the target grasp position also includes filtering the multiple grasp configurations based on the horizontal plane openness and the vertical plane openness to identify grasp configurations meet a height threshold and/or an approach threshold for the first pad and/or the second pad to grasp the target object.

The example method 1, where determining the horizontal plane openness includes determining a distance of an open space extending from the open edge horizontally based on a depth difference between a top surface of the target object and a top surface of an adjacent object. The method further comprises determining whether the horizontal plane openness is greater than a horizontal threshold openness required for the first pad to grasp the target object.

The example method 1, where determining the vertical plane openness includes determining a distance of an open space extending from the open edge vertically based on image data depicting the target object at the start location. The method further includes determining whether the vertical plane openness is greater than a vertical threshold openness required for the first pad to grasp the target object.

The example method 1, further comprising determining a grasp set of one or more of grasp models that represent unique poses of the multi-surface gripper for grasping the target object. The method includes determining a grasp feasibility for one or more of the grasp models from the grasp set based on the horizontal plane openness and the vertical plane openness for the open edge of the target object. The method includes determining a placement feasibility for one or more of the grasp model according to one or more conditions at or about the placement location. The placement feasibility represents a grip location and a corresponding pose for the multi-surface gripper assembly allowing the multi-surface gripper assembly to approach, grip, and place the target object. Deriving the motion plan includes calculating a trajectory for the multi-surface gripper assembly according to the grasp feasibility and the placement feasibility of the grasp model. Deriving the motion plan includes calculating the trajectory includes iteratively determining a sequence of collision-free locations for the multi-surface gripper assembly and the target object and deriving the motion plan based on the trajectory.

Conclusion

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text.

Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A multi-surface gripper, comprising:
   a first pad configured to grasp a first surface of a target object, the first pad including a first plurality of suction elements;
   a second pad configured to grasp a second surface of the target object, the second pad including a second plurality of suction elements, wherein:
      the first pad and the second pad are operably coupled with each and positioned non-parallel with respect to each other so that the first pad is configured to grasp a first surface of a target object and the second pad is configured to contact a second surface of the target object that is non-parallel to the first surface of the target object; and
   a positioning mechanism to move the second pad along a vertical direction and a horizontal direction.

2. The multi-surface gripper of claim 1, wherein:
   the first pad and the second pad are positioned substantially orthogonal to each other such that the first plurality of suction elements defines a first grip interface and the second plurality of suction elements defines a second grip interface substantially orthogonal to the first grip interface.

3. The multi-surface gripper of claim 2, wherein:
   the first grip interface is configured to grasp a vertical surface of the target object; and
   the second grip interface is configured to grasp a horizontal surface of the target object.

4. The multi-surface gripper of claim 1, wherein the second pad has a fixed position and/or orientation with respect to the first pad.

5. The multi-surface gripper of claim 1, wherein the second pad is operably coupled with the first pad so that a position and/or an orientation of the second pad is changeable with respect to a position and/or an orientation of the first pad.

6. The multi-surface gripper of claim 1, wherein:
   the first plurality of suction elements includes a first zone of suction elements and a second zone, adjacent to the first zone, of suction elements, and
   the first zone of suction elements and the second zone of suction elements are independently activatable.

7. A robotic system comprising:
   a robotic arm; and
   an end effector kinetically coupled to an end portion of the robotic arm, the end effector including a multi-surface gripper having:
      a first pad including a first plurality of suction elements;
      a second pad including a second plurality of suction elements, wherein:
      the first pad and the second pad are operably coupled with each other and positioned non-parallel with respect to each other so that the first pad is configured to grasp a first surface of a target object and the second pad is configured to contact a second surface of the target object that is non-parallel to the first surface of the target object; and
   a positioning mechanism to move the second pad along a vertical direction and a horizontal direction.

8. The robotic system of claim 7, wherein:
   the first pad and the second pad are positioned substantially orthogonal to each other such that the first plurality of suction elements defines a first grip interface and the second plurality of suction elements defines a second grip interface substantially orthogonal to the first grip interface.

9. The robotic system of claim 7, wherein the second pad is operably coupled with the first pad so that the position of the second pad is changeable with respect to the first pad.

10. The robotic system of claim 7, wherein the robotic arm is configured to move the end effector in a linear and rotational manner.

11. The robotic system of claim 7, wherein the end effector further includes a vision sensor device configured to detect, by one or more optical sensors, positions of target objects positioned beneath the robotic arm.

12. A method of operating a robotic system, the method comprising:
   generating, based on sensor information depicting objects at a start location, a detection hypothesis corresponding to a target object, wherein the detection hypothesis for the target object is generated at least based on having an open edge for grasping the target object using a multi-surface gripper assembly that includes a first pad configured to grasp a first surface of the target object and a second pad configured to grasp a second surface of the target object;
   determining a horizontal plane openness and a vertical plane openness for the open edge, wherein the horizontal plane openness and the vertical plane openness represent an amount of unobstructed space around the open edge;
   deriving a motion plan for the multi-surface gripper to transfer the target object from the start location to a placement location, wherein deriving the motion plan includes determining a grasp model defining a position for the first pad on the first surface of the target object and the second pad relative to the second surface of the target object based on the horizontal plane openness and the vertical plane openness; and
   implementing the motion plan for transferring the target object from the start location to the placement location in accordance with the motion plan.

13. The method of claim 12, wherein identifying the open edge includes:
   determining an exposed corner as a vertex between the open edge and an intersecting open edge; and generating a hypothesis refinement for the detection hypothesis based on a position of the exposed corner and the two open edges extending from the exposed corner.

14. The method of claim 12, wherein deriving the motion plan includes:
calculating an approach trajectory including a trajectory for moving the multi-surface gripper assembly from a first position to a second position,
wherein the second position is above the target object, so that the multi-surface gripper assembly can initiate a grasp approach to contact a surface of the target object from the second position.

15. The method of claim 12, wherein determining the target grasp position for the first pad includes determining a default pad position at or about an open corner for the first pad when the target object does not correspond to a registered object.

16. The method of claim 12, wherein determining the target grasp position includes:
determining multiple grasp configurations for a combination of the multi-surface gripper and the target object, a respective grasp configuration of the multiple grasp configurations including a position and an orientation of the first pad relative to the open edge of the target object; and
filtering the multiple grasp configurations based on the horizontal plane openness and the vertical plane openness to identify grasp configurations that meet a height threshold and/or an approach threshold the first pad and/or the second pad to grasp the target object.

17. The method of claim 12, wherein:
determining the horizontal plane openness includes:
determining a distance of an open space extending from the open edge horizontally based on a depth difference between a top surface of the target object and a top surface of an adjacent object, and
the method further comprising determining whether the horizontal plane openness is greater than a horizontal threshold openness required for the first pad to grasp the target object.

18. The method of claim 12, wherein:
determining the vertical plane openness includes:
determining a distance of an open space extending from the open edge vertically based on image data depicting the target object at the start location, and
the method further includes determining whether the vertical plane openness is greater than a vertical threshold openness required for the first pad to grasp the target object.

19. The method of claim 12, further comprising:
determining a grasp set of one or more of grasp models that represent unique poses of the multi-surface gripper for grasping the target object;
determining a grasp feasibility for one or more of the grasp models from the grasp set based on the horizontal plane openness and the vertical plane openness for the open edge of the target object; and
determining a placement feasibility for one or more of the grasp model according to one or more conditions at or about the placement location, wherein the placement feasibility represents a grip location and a corresponding pose for the multi-surface gripper assembly allowing the multi-surface gripper assembly to approach, grip, and place the target object, wherein deriving the motion plan includes:
calculating a trajectory for the multi-surface gripper assembly according to the grasp feasibility and the placement feasibility of the grasp model, wherein calculating the trajectory includes iteratively determining a sequence of collision-free locations for the multi-surface gripper assembly and the target object; and
deriving the motion plan based on the trajectory.

20. A non-transitory computer readable medium including processor instructions for operating a robotic system that, when executed by one or more processors, causes the one or more processors to:
generating, based on sensor information depicting objects at a start location, a detection hypothesis corresponding to a target object, wherein the detection hypothesis for the target object is generated at least based on having an open edge for grasping the target object using a multi-surface gripper assembly that includes a first pad configured to grasp a first surface of the target object and a second pad configured to grasp a second surface of the target object;
determining a horizontal plane openness and a vertical plane openness for the open edge, wherein the horizontal plane openness and the vertical plane openness represent an amount of unobstructed space around the open edge;
deriving a motion plan for the multi-surface gripper to transfer the target object from the start location to a placement location, wherein deriving the motion plan includes determining a grasp model defining a position for the first pad on the first surface of the target object and the second pad relative to the second surface of the target object based on the horizontal plane openness and the vertical plane openness; and
implementing the motion plan for transferring the target object from the start location to the placement location in accordance with the motion plan.

* * * * *